(12) United States Patent
Griffith et al.

(10) Patent No.: US 8,338,505 B2
(45) Date of Patent: Dec. 25, 2012

(54) ALUMINA-ENHANCED POLYESTER RESINS AND METHODS FOR MAKING THE SAME

(75) Inventors: Sharon Sue Griffith, Charlotte, NC (US); Tony Clifford Moore, Charlotte, NC (US); Robert Joseph Schiavone, Matthews, NC (US)

(73) Assignee: DAK Americas Mississippi Inc., Bay St. Louis, MS (US)

( * ) Notice: Subject to any disclaimer, the term of this patent is extended or adjusted under 35 U.S.C. 154(b) by 694 days.

(21) Appl. No.: 12/119,723

(22) Filed: May 13, 2008

(65) Prior Publication Data

US 2008/0274316 A1 Nov. 6, 2008

Related U.S. Application Data

(63) Continuation-in-part of application No. PCT/US2006/044185, filed on Nov. 14, 2006.

(60) Provisional application No. 60/736,706, filed on Nov. 15, 2005.

(51) Int. Cl.
- *C08K 9/04* (2006.01)
- *C08K 3/22* (2006.01)
- *B29D 22/00* (2006.01)

(52) U.S. Cl. ........ 523/200; 524/430; 524/605; 428/35.7

(58) Field of Classification Search .................. 523/200; 428/35.7; 524/430, 605
See application file for complete search history.

(56) References Cited

U.S. PATENT DOCUMENTS

| | | | |
|---|---|---|---|
| 3,884,870 A * | 5/1975 | Dodson et al. ............... 523/220 |
| 4,092,289 A | 5/1978 | Remmington |
| 4,162,245 A | 7/1979 | Collins et al. |
| 5,023,291 A | 6/1991 | Sakamoto et al. |
| 5,376,702 A | 12/1994 | Stibal et al. |
| 5,472,831 A * | 12/1995 | Nishiura et al. ............. 430/501 |
| 5,580,652 A | 12/1996 | Lee et al. |
| 5,702,794 A | 12/1997 | Hosoi et al. |
| 5,718,971 A | 2/1998 | Lee et al. |
| 5,898,058 A | 4/1999 | Nichols et al. |
| 6,284,866 B1 | 9/2001 | Schiavone |
| 6,309,718 B1 | 10/2001 | Sprayberry |
| 6,335,422 B2 | 1/2002 | Schiavone |
| 6,500,890 B2 | 12/2002 | Edwards et al. |
| 6,569,991 B2 | 5/2003 | Nichols et al. |
| 6,573,359 B2 | 6/2003 | Nichols et al. |
| 6,590,069 B2 | 7/2003 | Nichols et al. |
| 6,599,596 B2 | 7/2003 | Nichols et al. |
| 6,710,158 B2 | 3/2004 | Edwards et al. |
| 6,727,306 B2 | 4/2004 | Edwards et al. |
| 6,803,082 B2 | 10/2004 | Nichols et al. |
| 6,846,435 B1 * | 1/2005 | Bohnen et al. ............. 252/363.5 |
| 6,911,523 B2 | 6/2005 | Rule |
| 7,094,863 B2 | 8/2006 | Moore et al. |
| 7,129,317 B2 | 10/2006 | Moore et al. |
| 7,238,770 B2 | 7/2007 | Edwards et al. |
| 2004/0254331 A1 * | 12/2004 | Minobe et al. ................. 528/279 |
| 2005/0089658 A1 | 4/2005 | Scantlebury et al. |
| 2005/0170175 A1 | 8/2005 | Nichols et al. |
| 2005/0171326 A1 | 8/2005 | Edwards et al. |
| 2005/0261462 A1 | 11/2005 | Nichols et al. |
| 2007/0059465 A1 | 3/2007 | Thompson et al. |
| 2008/0113189 A1 | 5/2008 | Bhimaraj et al. |

FOREIGN PATENT DOCUMENTS

| | | |
|---|---|---|
| JP | 02-206628 | 8/1990 |
| WO | 2004104080 A1 | 12/2004 |
| WO | 2005073272 A1 | 8/2005 |
| WO | 2005103110 A2 | 11/2005 |
| WO | 2006079044 A2 | 7/2006 |
| WO | 2007059128 | 5/2007 |
| WO | 2007127786 A2 | 11/2007 |
| WO | 2008008813 A2 | 1/2008 |
| WO | 2008008836 A2 | 1/2008 |

OTHER PUBLICATIONS

Wypych, George. Handbook of Fillers, 2nd Edition. Toronto, ChemTec Publishing, 2000, p. 20. TP1114.W96.*

Boehmite Mineral Data, downloaded from webmineral.com on Oct. 4, 2005.

* cited by examiner

*Primary Examiner* — Vickey Nerangis

(74) *Attorney, Agent, or Firm* — Oblon, Spivak, McClelland, Maier & Neustadt, L.L.P.

(57) ABSTRACT

The invention embraces polymer resins, such as polyethylene terephthalate resin, that includes surface-compatibilized alumina. The invention also embraces methods of making polyethylene terephthalate resins that are capable of being formed into low-haze, high-clarity articles possessing reduced coefficient of friction.

14 Claims, 9 Drawing Sheets

ALUMINA-ENHANCED POLYESTER RESINS AND METHODS FOR MAKING THE SAME

CROSS-REFERENCE TO PRIORITY APPLICATIONS

This application is a continuation-in-part of commonly assigned International Patent Application No. PCT/US2006/044185 for Alumina-Enhanced Polyester Resins and Methods for Making the Same, filed Nov. 14, 2006, (and published May 24, 2007, as Publication No. WO 2007/059128), which itself claims the benefit of commonly assigned U.S. Provisional Patent Application Ser. No. 60/736,706, for Alumina-Enhanced Polyester Resins and Methods for Making the Same, filed Nov. 15, 2005. This nonprovisional application claims the benefit of and incorporates entirely by reference both this international application and this U.S. provisional patent application, including its attachments.

CROSS-REFERENCE TO COMMONLY ASSIGNED APPLICATIONS

This application incorporates entirely by reference the following commonly assigned patents and patent applications, which disclose polymer resins having reduced frictional properties and associated methods: Ser. No. 09/738,619, for Polyester Bottle Resins Having Reduced Frictional Properties and Methods for Making the Same, filed Dec. 15, 2000, now U.S. Pat. No. 6,500,890; Ser. No. 10/177,932 for Methods for Making Polyester Bottle Resins Having Reduced Frictional Properties, filed Jun. 21, 2002, now U.S. Pat. No. 6,710,158; and Ser. No. 10/176,737 for Polymer Resins Having Reduced Frictional Properties, filed Jun. 21, 2002, now U.S. Pat. No. 6,727,306. This application further incorporates entirely by reference the following commonly assigned patents and patent applications, which disclose methods for introducing additives to polymers: Ser. No. 08/650,291 for a Method of Post-Polymerization Stabilization of High Activity Catalysts in Continuous Polyethylene Terephthalate Production, filed May 20, 1996, now U.S. Pat. No. 5,898,058; Ser. No. 09/738,150, for Methods of Post-Polymerization Injection in Continuous Polyethylene Terephthalate Production, filed Dec. 15, 2000, now U.S. Pat. No. 6,599,596; Ser. No. 09/932,150, for Methods of Post-Polymerization Extruder Injection in Polyethylene Terephthalate Production, filed Aug. 17, 2001, now U.S. Pat. No. 6,569,991; Ser. No. 10/017,612, for Methods of Post-Polymerization Injection in Condensation Polymer Production, filed Dec. 14, 2001, now U.S. Pat. No. 6,573,359; Ser. No. 10/017,400, for Methods of Post-Polymerization Extruder Injection in Condensation Polymer Production, filed Dec. 14, 2001, now U.S. Pat. No. 6,590,069; Ser. No. 10/628,077, for Methods for the Late Introduction of Additives into Polyethylene Terephthalate, filed Jul. 25, 2003, now U.S. Pat. No. 6,803,082; and Ser. No. 10/962,167, for Methods for Introducing Additives into Polyethylene Terephthalate, filed Oct. 8, 2004, (and published Aug. 4, 2005, as Publication No. 2005/0170175 A1).

This application further incorporates entirely by reference the following commonly assigned patents and patent applications, which disclose polymer resins and polymer processes: U.S. patent application Ser. No. 09/456,253, filed Dec. 7, 1999, for a Method of preparing Modified Polyester Bottle Resins, now U.S. Pat. No. 6,284,866; U.S. patent application Ser. No. 09/851,240, filed May 8, 2001, for a Method of preparing Modified Polyester Bottle Resins, now U.S. Pat. No. 6,335,422; U.S. patent application Ser. No. 10/850,269, for Methods of Making Titanium-Catalyzed Polyester Resins, filed May 20, 2004, (and published Nov. 24, 2005, as Publication No. 2005/0261462 A1); U.S. patent application Ser. No. 10/850,918, for Slow-Crystallizing Polyester Resins, now U.S. Pat. No. 7,129,317; U.S. patent application Ser. No. 10/996,789, for Polyester Preforms Useful for Enhanced Heat-Set Bottles, filed Nov. 24, 2004, now U.S. Pat. No. 7,094,863; U.S. patent application Ser. No. 11/046,481, for Methods of Making Imide-Modified Polyester Resins, filed Jan. 28, 2005, (and published Aug. 4, 2005, as Publication No. 2005/0171326 A1); and U.S. patent application Ser. No. 11/466,066, filed Aug. 21, 2006, for Polyester Resins for High-Strength Articles, (and published Mar. 15, 2007, as Publication No. 2007/0059465 A1).

This application further incorporates entirely by reference the following commonly assigned provisional patent applications, which disclose polymer resins and polymer processes: U.S. Provisional Patent Application Ser. No. 60/738,867, for Melt-Phase Polycondensation of Titanium-Catalyzed PET Resins, filed Nov. 22, 2005; U.S. Provisional Patent Application Ser. No. 60/739,796, for Polyester Resins for High-Strength Articles, filed Nov. 23, 2005; U.S. Provisional Patent Application Ser. No. 60/739,498, for Polyester Resins for High-Efficiency Injection Molding, filed Nov. 23, 2005; and U.S. Provisional Patent Application Ser. No. 60/739,645, for Polyalkylene Terephthalate Resins for High-Strength Articles, filed Nov. 23, 2005.

Finally, this application further incorporates entirely by reference the following commonly assigned international patent applications, which disclose polymer resins and polymer processes: International Patent Application No. PCT/US04/16375 for Slow-Crystallizing Polyester Resins, filed May 21, 2004 (and published Dec. 2, 2004, as WO 2004/104080); International Patent Application No. PCT/US04/39726 for Methods of Making Titanium-Catalyzed Polyethylene Terephthalate Resins, filed Nov. 24, 2004, (and published Nov. 3, 2005, as WO 2005/103110); International Patent Application No. PCT/US05/03149 for Imide-Modified Polyester Resins and Methods of Making the Same, filed Jan. 28, 2005, (and published Aug. 11, 2005, as Publication No. WO 2005/073272); International Patent Application No. PCT/US06/02385 for Improved Polyamide-Polyester Polymer Blends and Methods of Making the Same, filed Jan. 23, 2006, (and published Jul. 27, 2006, as Publication No. WO 2006/079044); International Patent Application No. PCT/US07/67392 for Methods for Making Polyester Resins in Falling Film Melt Polycondensation Reactors, filed Apr. 25, 2007, (and published Nov. 8, 2007, as Publication No. WO 2007/127786); International Patent Application No. PCT/US07/73224 for Solid Phase Polymerization Catalyst System, filed Jul. 11, 2007, (and published Jan. 17, 2008, as Publication No. WO 2008/008813); and International Patent Application No. PCT/US07/73259 for Composite Solid Phase Polymerization Catalyst, filed Jul. 11, 2007, (and published Jan. 17, 2008, as Publication No. WO 2008/008836).

BACKGROUND OF THE INVENTION

Polyester resins, especially polyethylene terephthalate (PET) and its copolyesters, are widely used to produce rigid packaging, such as two-liter soft drink containers. Polyester packages produced by stretch-blow molding possess high strength and shatter resistance, and have excellent gas barrier and organoleptic properties as well. Consequently, such plastics have virtually replaced glass in packaging numerous consumer products (e.g. carbonated soft drinks, fruit juices, and peanut butter).

Polyethylene terephthalate bottles, such as straight-walled two-liter carbonated soft drink bottles, often possess high coefficients of friction (COF). In the bottling industry, this "sticky-bottle" problem is significant. Excessive friction between adjacent bottles prevents such bottles from easily and efficiently sliding past one another as they are depalletized. To improve depalletizing, bottlers conventionally resort to water misting and line lubrication on a filling line.

The aforementioned commonly assigned U.S. Pat. Nos. 6,500,890 and 6,710,158 disclose enhancing polyester resins with small amounts of inert particulates, namely talc and calcium carbonate. The resulting polyester resins are capable of yielding high-clarity preforms and bottles that possess reduced coefficients of friction, thereby addressing aspects of the "sticky-bottle" problem. Indeed, bottles formed from such resins reduce the need for external lubricants during depalletizing operations.

Nevertheless, there is a desire to provide alternative polymer resins that are capable of forming articles possessing increased clarity, reduced frictional characteristics, or both.

SUMMARY OF THE INVENTION

Accordingly, it is an object of the present invention to provide polyester resin that is capable of being formed into low-haze, high-clarity articles possessing reduced coefficient of friction (COF).

It is yet another object of the present invention to provide methods for making a polyester resin that can be formed into high-clarity sheets, films, and bottles possessing reduced coefficient of friction.

It is yet another object of the present invention to provide alumina-enhanced polyethylene terephthalate resin that is capable of being formed into low-haze, high-clarity articles possessing reduced coefficient of friction.

It is yet another object of the present invention to provide an alumina-enhanced polyethylene terephthalate bottle possessing high clarity properties and reduced friction characteristics.

It is yet another object of the present invention to provide methods for making alumina-enhanced polyethylene terephthalate resin that can be formed into high-clarity sheets, films, and bottles possessing reduced coefficient of friction.

It is yet another object of the present invention to provide surface-treated alumina that promotes improved compatibility with the polyester matrix.

It is yet another object of the present invention to provide a condensation polymer resin that is capable of being formed into low-haze, high-clarity articles possessing reduced coefficient of friction (COF).

It is yet another object of the present invention to provide a non-polyester polymer resin that is capable of being formed into low-haze, high-clarity articles possessing reduced coefficient of friction (COF).

It is yet another object of the present invention to provide a system of selecting an appropriate additive for reducing coefficient of friction (COF) in polymer resins by matching the respective refraction indices of the COF additive and the polymer matrix.

It is yet another object of the present invention to provide a system of selecting an appropriate additive for reducing coefficient of friction (COF) depending on the kind and quantity of comonomer modifier present in the particular polymer matrix.

The foregoing, as well as other objectives and advantages of the invention and the manner in which the same are accomplished, is further specified within the following detailed description and its accompanying drawings.

DETAILED DESCRIPTION

Figure 1:
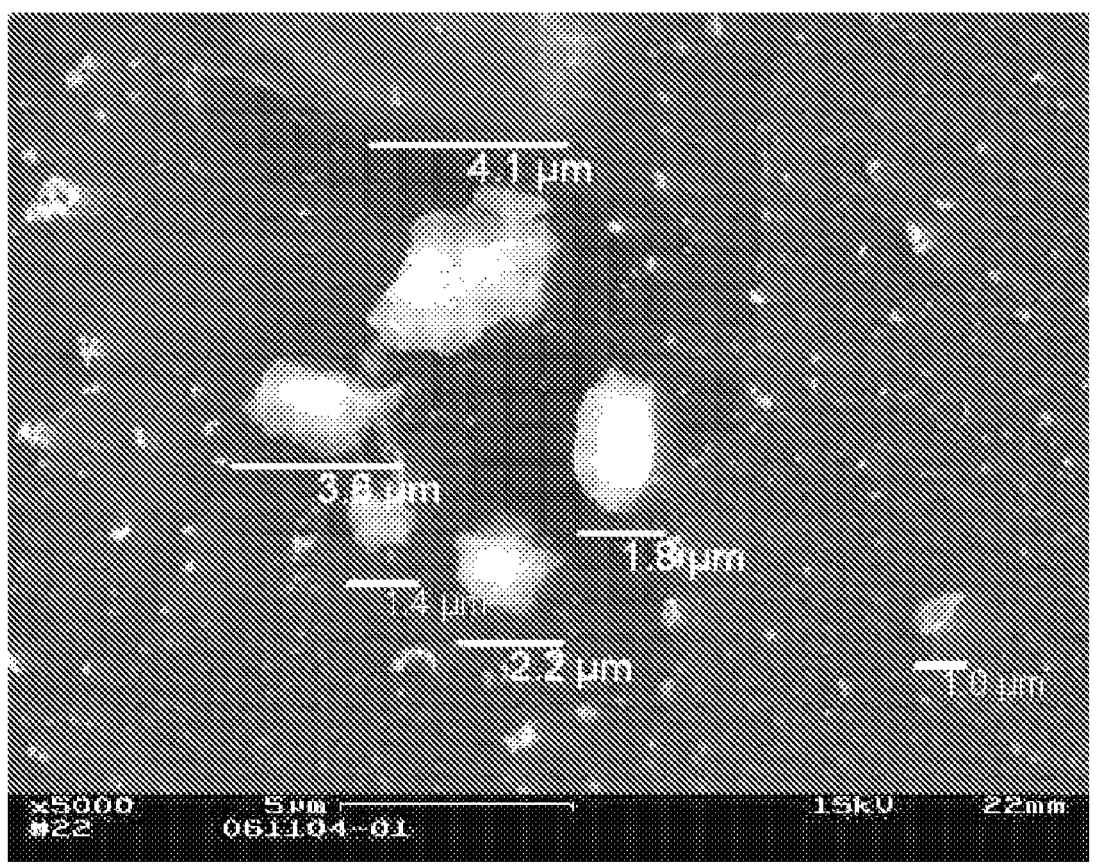
FIGS. 1 and 2 are SEM photographs depicting alumina agglomerates within the sidewall of a two-liter carbonated soft drink bottle at 5000× magnification.

In one aspect, the invention is a polyester resin (e.g., polyethylene terephthalate) that is capable of being formed into low-haze, high-clarity articles possessing reduced coefficient of friction (COF). Exemplary articles according to the present invention include films, sheets, and containers.

In another aspect, the invention embraces methods for making a polyester resin that can be formed into high-clarity sheets, films, and bottles possessing reduced coefficient of friction. Such methods generally include reacting a terephthalate component and a diol component (i.e., a terephthalate moiety and a diol moiety) to form polyethylene terephthalate precursors, which are then polymerized via melt phase polycondensation to form polymers of polyethylene terephthalate of desired molecular weight. The method is characterized by the introduction of alumina in an amount sufficient to reduce the coefficient of friction in articles formed from the polyethylene terephthalate polymers.

Coefficient of friction reduction is achieved by the incorporation of alumina, typically surface-compatibilized alumina. As used herein, the term "alumina" refers to aluminum oxides, such as corundum (CAS1302-74-5), which has the chemical formula $Al_2O_3$, and aluminum hydroxides, such as boehmite (CAS 1318-23-6) and diaspore (CAS 14457-84-2), which have the chemical formulae $AlO(OH)$ or $Al_2O_3.H_2O$, or gibbsite (CAS 14762-49-3), bayerite (CAS 20257-20-9), doyleite, nordstrandite (CAS 13840-05-6), which have the chemical formula $Al(OH)_3$ (i.e., aluminum trihydroxide) or $Al_2O_3.H_2O$. The gamma forms of aluminum hydroxide (i.e., boehmite and gibbsite) are especially effective, typically in purities exceeding 90 weight percent (e.g., where the alumina includes at least about 90 weight percent gamma $AlO(OH)$). Aluminum hydroxide including at least 90 weight percent boehmite (CAS 1318-23-6) is available from Sasol North America, Inc.

Two qualitative observations illustrate the benefits of surface-compatibilized alumina, namely (i) as compared with an otherwise identical polyester bottle without alumina, a polyester bottle that includes sufficient alumina will possess reduced coefficient of friction, and (ii) as compared with an otherwise identical polyester bottle that includes alumina without surface modification, a polyester bottle that includes surface-compatibilized alumina will possess reduced sidewall haze.

The alumina is present in an amount sufficient for the resulting polyethylene terephthalate resin to be capable of forming low-haze, high-clarity articles (e.g., preforms and bottles) that possess reduced coefficient of friction. In this regard, the polyester resin usually includes less than about 3,000 ppm of agglomerated alumina (i.e., some of the alumina particles are amassed in agglomerates). The alumina concentration in the polyester resin is typically between about 100 and 2,000 ppm (e.g., between about 200 and 1,500 ppm) and, for some applications, more typically between about 250 and 1,000 ppm (e.g. between about 300 and 800 ppm). For example, the addition of 500 ppm of surface-compatibilized alumina has been shown to reduce coefficient of friction in two-liter polyester bottles by more than about 90 percent as measured using ASTM Test method D 1894.

The alumina agglomerates have an average Feret's diameter of less than about 20 microns, typically less than 15 microns, and more typically less than 10 microns (e.g., between about 2 and 8 microns or between about 4 and 7 microns). In some instances, the alumina agglomerates have an average Feret's diameter of less than about 6 microns (e.g., between about 2 and 5 microns or between about 1 and 3 microns) or even less than 1 micron. Alumina agglomerates having an average Feret's diameter of much more than 20 microns generally lead to unacceptable bottle haze.

As used herein, terms such as "agglomerated alumina" and "alumina agglomerates" refer to conditions in which at least some alumina particles have formed into discrete masses (i.e., including two or more alumina particles) within the polyethylene terephthalate resin. With respect to the polyethylene terephthalate resin according to the present invention, terms like "agglomerated alumina" and "alumina agglomerates" embrace both distinct alumina particles and discrete masses of a plurality of alumina particles (i.e., "particle aggregates"). Accordingly, as described hereinafter, average Feret's diameter of alumina agglomerates reflects measurement of both distinct alumina particles and particle aggregates (i.e., discrete masses of a plurality of alumina particles). Moreover, the average Feret's diameter is reported as a number average (i.e., the mean) unless otherwise noted (e.g., an area-weighted average or a volume-weighted average).

Thus, in accordance with the foregoing, alumina is typically present in the polyethylene terephthalate resin in an amount between about 100 and 2,000 ppm, the alumina being amassed in agglomerates having an average Feret's diameter of less than about 10 microns (e.g., between about 2 and 7 microns), and typically less than 8 microns (e.g., between about 3 and 6 microns).

A polyester resin can include relatively higher concentrations of smaller alumina agglomerates without adversely affecting article clarity, provided such smaller alumina agglomerates do not promote excessive nucleation. A polyester resin that includes larger alumina agglomerates, however, will require lesser concentrations to achieve substantial improvement to its frictional properties (i.e., as compared with smaller agglomerates, larger agglomerates can be included in the polymer matrix at lower concentrations to achieve the same friction reduction). Thus, the polyester resin of the present invention will typically include higher concentrations of alumina agglomerates having a smaller average Feret's diameter and smaller concentration of alumina agglomerates having a larger average Feret's diameter.

For example, it is thought that surface-compatibilized alumina that is amassed in agglomerates having an average Feret's diameter of between about 5 and 10 microns might be present in the polyester resin in an amount between about 50 and 1,500 ppm (e.g., 100-250 ppm) whereas surface-compatibilized alumina that is amassed in agglomerates having an average Feret's diameter of less than about 5 microns (e.g., between about 1 and 4 microns) might be present in the polyester resin in an amount between about 250 and 2,000 ppm (e.g., 400-1,000 ppm). Similarly, it is thought that surface-compatibilized alumina that is amassed in agglomerates having an average Feret's diameter of between about 7 and 10 microns might be present in the polyester resin in an amount between about 50 and 1,000 ppm, whereas surface-compatibilized alumina that is amassed in agglomerates having an average Feret's diameter of between about 1 and 2 microns might be present in the polyester resin in an amount between about 1,500 and 2,500 ppm.

Based on observations, it is thought that polyester resin used to form an article possessing a higher stretch ratio (e.g., a carbonated soft drink bottle or a water bottle) will require relatively lesser concentrations of alumina to provide meaningful improvement to its frictional properties. For instance, a two-liter carbonated soft drink bottle or a two-liter water bottle might be formed at a stretch ratio of between about 6 and 15 (i.e., the product of axial and hoop stretch). A two-liter carbonated soft drink bottle or a two-liter water bottle containing 125-250 ppm of surface-compatibilized alumina having a Feret's diameter of between about 3 and 6 microns can achieve substantial COF reductions (75 percent to 95 percent or more) while retaining acceptable clarity (e.g., less than 5 percent sidewall haze.) For some high-stretch applications (e.g., employing a stretch ratio of more than about 12 or so), the presence of relatively small amounts of alumina (e.g., 5 ppm, 10 ppm, or ppm) might provide useful COF reduction. More typically, at least 25 ppm of alumina (e.g., 50 ppm or more) will be employed to achieve articles having substantially improved frictional properties.

Conversely, a polyester resin that is used to form an article possessing a lower stretch ratio (e.g., a peanut butter jar, an alcohol container, a shampoo bottle, a cosmetic package, or other personal hygiene container), will probably require higher alumina concentrations to achieve substantial improvement to its frictional properties. Such "custom" containers, which can be formed at a stretch ratio of 6 or less (e.g. 2-4), might possess alumina in an amount between about 250 and 500 ppm, such as between about 350 and 450 ppm (e.g., 375-400 ppm).

As herein discussed, it is believed that excellent friction and haze characteristics can be achieved at even lower alumina loadings if excessively large alumina particles and extremely small alumina particles are removed (i.e., size reduced or culled from the alumina stock) before introduction into the polyethylene terephthalate polymers or polymeric precursors. Accordingly, the foregoing exemplary alumina concentrations might be reduced with improved control over particle size distribution. In this regard, it might be possible to reduce alumina loading by 5-50 percent or more.

As noted, average Feret's diameter of alumina agglomerates reflects measurements of both distinct alumina particles and particle aggregates (i.e., discrete masses of a plurality of alumina particles). As used herein, Feret's diameter for alumina agglomerates, which are usually irregular, is measured against an ocular microscale by measuring the distance between two parallel lines that are tangent to the agglomerate's profile and perpendicular to the ocular scale. Upon measuring numerous alumina agglomerates (i.e., particles and/or particle aggregates) using the same microscale alignment (e.g., horizontal), mean diameter is readily calculated (i.e., average Feret's diameter). See e.g., FIG. 1, which depicts the measurement of Feret's diameter for alumina agglomerates within a two-liter carbonated soft drink bottle.

In addition, these same measurements of Feret's diameter can yield average volume-weighted Feret's diameter, which characterizes the sample distribution of alumina agglomerates by volume. In particular, the "spherical" volume of each agglomerate can be estimated from its measured Feret's diameter (i.e., volume=$4/3 \cdot \pi \cdot r^3$). Moreover, as the density of alumina is presumed constant, a distribution by volume-weighted diameter is likewise a distribution by agglomerate mass. Thus, average volume-weighted Feret's diameter may provide another meaningful description of the relationship between agglomerate size distribution and total alumina loading.

For the purposes of characterizing the alumina-enhanced resins according to the present invention, alumina agglomerates having a Feret's diameter of less than 0.5 micron are disregarded. Such smaller alumina agglomerates are thought to provide negligible COF reduction. Consequently, average Feret's diameter (i.e., a number-average calculation) is appropriately skewed upward. Those having ordinary skill in the art will appreciate, however, that disregarding alumina agglomerates having a Feret's diameter of less than 0.5 micron has a lesser effect upon the calculation of average volume-weighted Feret's diameter.

The determination of Feret's diameter is set forth in Volume 1 of *The Particle Atlas* (Edition Two, 1973) at pages 264-265. These pages, which were included as Attachment 1 to priority U.S. Provisional Patent Application Ser. No. 60/736,706, are incorporated herein in their entirety.

To facilitate the measurement of average Feret's diameter in an alumina-enhanced polyester resin, the polyester matrix may be dissolved, thereby leaving randomly oriented alumina particles and particle aggregates. Alternatively, if the alumina-enhanced polyester resin is in the form of a relatively flat article (e.g., a film, a sheet, or even a bottle sidewall), average Feret's diameter can be microscopically measured without polymer dissolution.

Figure 2:
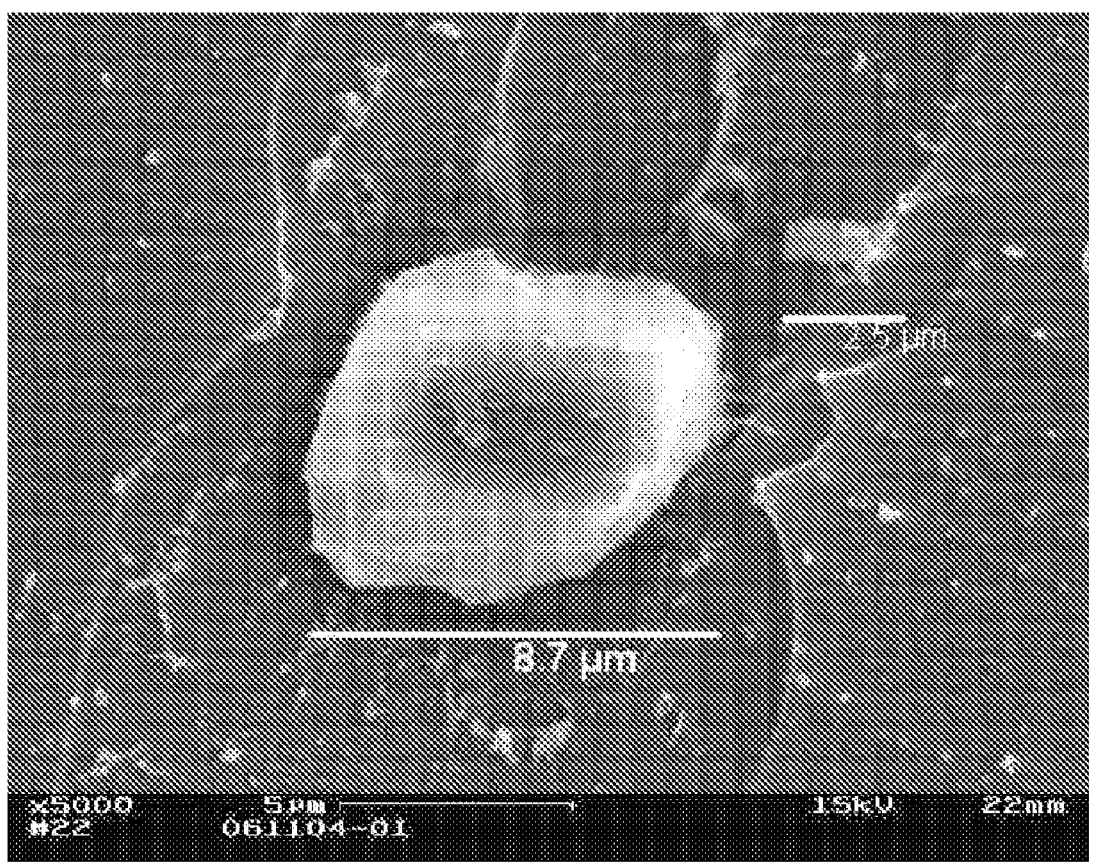

FIGS. 1 and 2 are exemplary photographs depicting the measurement of Feret's diameter. FIGS. 1 and 2 show, at a magnification of 5000×, alumina agglomerates within the sidewall of a two-liter carbonated soft drink bottle.

Table 1 (below) shows respective Feret's diameters for several alumina agglomerates (including those depicted in FIGS. 1 and 2) as measured within the sidewall of a two-liter carbonated soft drink bottle. Table 1A (below) summarizes the corresponding average Feret's diameter and average volume-weighted Feret's diameter for this exemplary sample of alumina agglomerates.

TABLE 1

| Feret's Diameter (μ) | Predicted Spherical Volume ($\mu^3$) ($4/3 \cdot \Pi \cdot r^3$) |
|---|---|
| 1.0 | 0.5 |
| 1.0 | 0.5 |
| 1.3 | 1.2 |
| 1.4 | 1.4 |
| 1.8 | 3.1 |
| 2.0 | 4.2 |
| 2.2 | 5.6 |

TABLE 1-continued

| Feret's Diameter (μ) | Predicted Spherical Volume ($\mu^3$) ($4/3 \cdot \Pi \cdot r^3$) |
|---|---|
| 2.5 | 8.2 |
| 2.5 | 8.2 |
| 2.5 | 8.2 |
| 3.6 | 24.4 |
| 3.7 | 26.5 |
| 4.1 | 36.1 |
| 4.9 | 61.6 |
| 8.7 | 344.8 |
| 8.9 | 369.1 |
| Σ (n = 16) | 903.6 |

TABLE 1A

| | |
|---|---|
| Average Feret's Diameter (μ) | 3.3 |
| Cumulative Predicted Spherical Volume ($\mu^3$) | 903.6 |
| Average Predicted Spherical Volume ($\mu^3$) | 56.5 |
| Average Volume-Weighted Feret's Diameter (μ) | 4.8 |

In brief, it is thought that measuring a statistically significant number of alumina agglomerates facilitates meaningful characterization of the alumina-enhanced resins of the present invention, even though the alumina agglomerates are typically of irregular shape.

In accordance with the foregoing, the alumina agglomerates in the polyethylene terephthalate resin according to the present invention typically possess an average volume-weighted Feret's diameter of less than about 20 microns and more typically less than 10 microns (e.g., between about 2 and 8 microns). And, in accordance with Table 1 (above), the alumina agglomerates may possess an average volume-weighted Feret's diameter of less than about 5 microns.

By way of example, alumina could be present in the polyethylene terephthalate resin in an amount less than about 3,000 ppm (e.g., between about 50 and 1,000 ppm) as agglomerates having an average volume-weighted Feret's diameter of less than about 8 microns (e.g. between about 3 and 6 microns). As noted, unless specified as being an area-weighted or volume-weighted average, "average" Feret's diameter of alumina agglomerates refers to the number average.

Without being bound to a particular theory, it is believed that the introduction of fillers may create discontinuous phases within the polyethylene terephthalate resin. During stretch-blow molding, such discontinuities lead to the formation of microvoids around the filler particles. This causes bottle haze because of differences in refractive index between the microvoid regions and the polyethylene terephthalate matrix. The microvoids are apparently caused by an inherent incompatibility of the filler particles with the polyethylene terephthalate matrix.

The surface of the alumina particles may be treated (i.e., "surface-compatibilized") to promote compatibility between the alumina and the polyester matrix. In this regard, the alumina is preferably treated with a coupling agent before its addition to polyethylene terephthalate polymers. This has been found to significantly reduce bottle haze. (Untreated alumina and surface-compatibilized alumina seem to provide comparable COF reduction.)

Accordingly, alumina may be surface treated using silanes, especially organosilanes such as 3-aminopropyl trimethoxy silane and 3-aminopropyl triethoxy silane, at a loading of less than 3 weight percent (e.g., between about 0.25 and 2.0 weight percent), more typically between about 0.5 and 1.5 weight percent (e.g., between about 0.75 and 1.0 weight percent). Alternatively, paratoluene sulfonic acid (PTSA) has been found to be an acceptable coupling agent, particularly when the surface-compatibilized alumina is introduced into the polymer matrix via masterbatching.

Without being bound to any theory, it is believed that a coupling agent will bind to an alumina particle via reactive sites at the particle's surface (i.e., the coupling agent occupies one or more reactive sites on the surface of the alumina particle). Because surface treatment substantially diminishes the availability of unoccupied reactive sites, the alumina particle will become much less reactive after treatment with the coupling agent. Consequently, surface-compatibilized alumina may perform relatively poorly as a catalyst within the polymer matrix.

It is further believed that treating alumina with these coupling agents facilitates compatibility between the alumina particles and the polyethylene terephthalate polymer by introducing covalent chemical bonding between the particle surface and the polyethylene terephthalate polymer, or by introducing a hydrophobic moiety that is compatible with the polyethylene terephthalate to facilitate better polymer wetting of the particle. In addition, and without being bound to any theory, it is thought that alumina aggregation, which has been observed to occur in the polymer melt, is affected by the degree to which the alumina particles are surface treated. In other words, it would be expected that alumina particles that are relatively lightly surface compatibilized (e.g. a loading of less than about 0.5 weight percent) tend to form comparatively larger alumina particle aggregates than do alumina particles that are more heavily surface-compatibilized (e.g., a loading of more than about 3 weight percent). Accordingly, and without being bound to any theory, it is thought that the size of the particle aggregates that form in the polymer matrix is primarily affected by the size of the alumina particles introduced into the polymer but is at least secondarily affected by the coupling agent loading (i.e., surface loading) on the compatibilized alumina.

Figure 3:
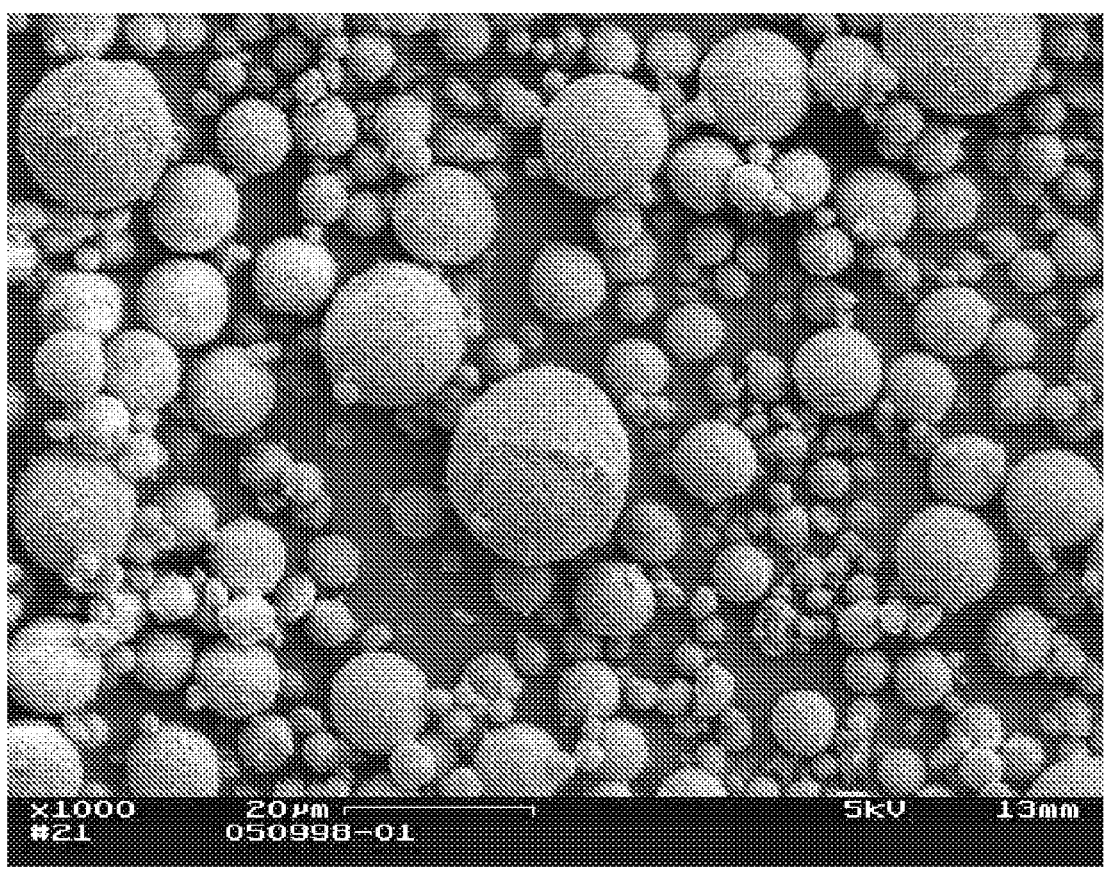
FIG. 3 is an SEM photograph depicting surface-compatibilized alumina particles at 1000× magnification.
Figure 4:
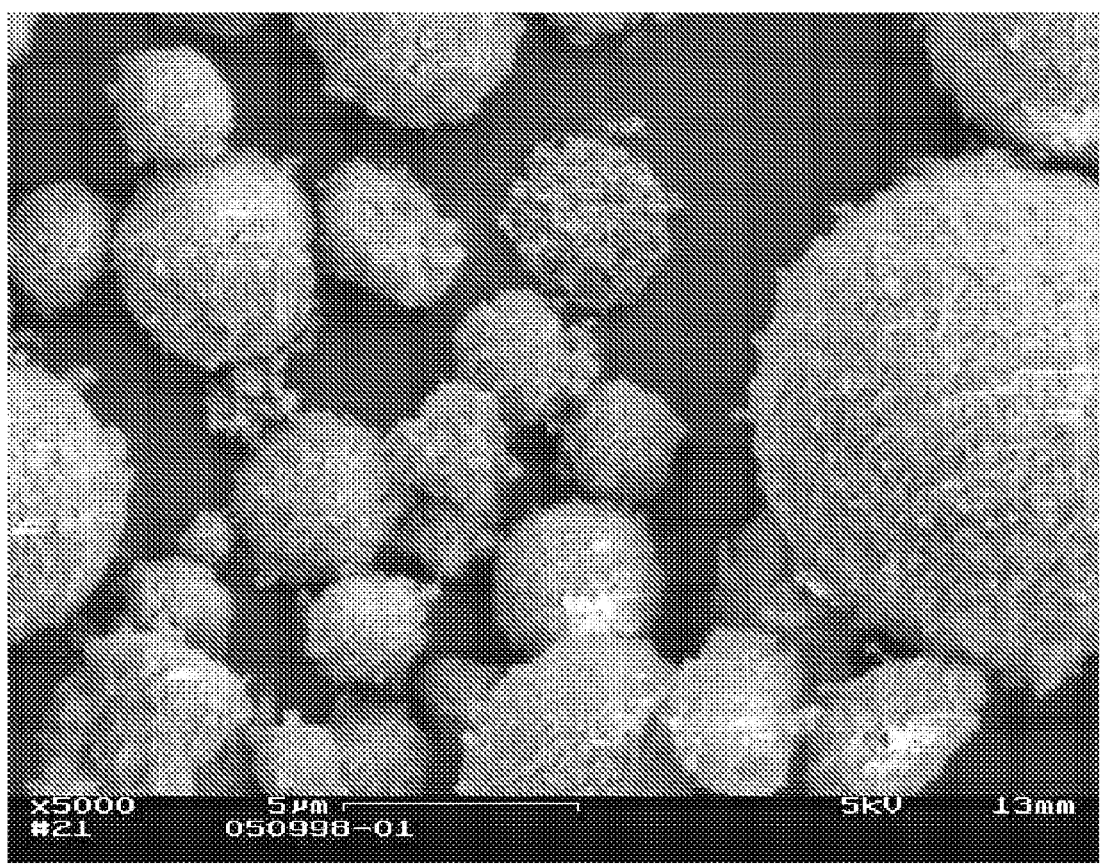
FIG. 4 is an SEM photograph depicting surface-compatibilized alumina particles at 5000× magnification.

Accordingly, surface-compatibilized alumina particles having an average volume-weighted particle size of less than about 10 microns-typically less than 6 microns (e.g., less than about 4 microns)—may be introduced into the polyethylene terephthalate polymers. FIGS. 3 and 4 are photographs depicting surface-compatibilized alumina particles having an average volume-weighted particle size of about 6 microns at magnifications of 1000× and 5000×, respectively.

As used herein, average volume-weighted particle size for alumina should be contrasted with average Feret's diameter of alumina agglomerates. Those having ordinary skill in the art will understand that average volume-weighted particle size distributions are determined before the alumina particles are introduced into the polyethylene terephthalate polymers. In contrast, alumina agglomerates within the alumina-enhanced polyester resin are sized via Feret's diameter. As described herein, determinations of average volume-weighted particle size and average Feret's diameter disregard particles and particle aggregates smaller than 0.5 micron.

That said and as noted, it has been observed that some, if not most, alumina particles tend to agglomerate in the polymer melt. For example, introducing into the polyethylene terephthalate polymers surface-compatibilized alumina particles having an average volume-weighted particle size of less than about 2 microns (e.g., less than about 1 micron) may yield a polyethylene terephthalate resin in which alumina is amassed in agglomerates having an average volume-weighted Feret's diameter of more than about 2 microns—and perhaps more than about 3 microns. Similarly, surface-compatibilized alumina particles having an average volume-weighted particle size of less than about 5 microns—and perhaps less than about 3 microns—may yield a polyethylene terephthalate resin that includes alumina agglomerates having an average volume-weighted Feret's diameter of more than about 5 microns. Likewise surface-compatibilized alumina particles having an average volume-weighted particle size of less than about 6 microns—and perhaps less than about 4 microns—may yield a polyethylene terephthalate resin that includes alumina agglomerates having an average volume-weighted Feret's diameter of more than about 6 microns. As noted, these exemplary Feret's diameter volume-weighted averages are based on measurements of both distinct alumina particles and discrete masses of two or more alumina particles (i.e., particle aggregates). In this regard, alumina particles and alumina particle aggregates are referred to collectively as "alumina agglomerates."

It is thought that polyester resins according to the present invention might achieve enhanced performance with respect to bottle COF and sidewall haze by reducing particle size variation. In this regard, too many excessively large particles will increase haze. Extremely small particles (i.e., fines) not only provide little COF reduction but also may function as nucleation sites, thereby promoting haze. At the very least, too many extremely small particles will increase alumina loading, which may constitute an unnecessary additive expense.

To attain alumina samples having more regular particle sizes (i.e., a tighter particle-size distribution), it may be advantageous to employ screening, filtering, and/or wet or dry milling processes. These exemplary size classification techniques are within the knowledge of those having ordinary skill in the art.

It is certainly desirable to eliminate those alumina particles that contribute nothing to (or perhaps even impair) the performance of polyester resins according to the present invention. As a conceptual matter, eliminating extremely small particles, which contribute little or nothing to COF reduction, and excessively large particles, which cause undesirable bottle sidewall haze, would reduce a resin's alumina concentration. Indeed, it is thought that if precise size distribution is achieved, excellent COF (and haze) results might be possible at significantly lower loadings of surface-compatibilized alumina.

By way of non-limiting example and as set forth in Tables 2 and 3 (below), eliminating only those particles larger than 10 microns, which are most likely to cause haze, might reduce alumina volume within the polyester resin by about 5 percent. Assuming a constant density of alumina, this would likewise reduce the polyester resin's alumina concentration by more than 5 percent. And employing more aggressive size classification could further reduce alumina loading. For example, eliminating particles of smaller than 1 micron, which less effectively reduce coefficient of friction, and particles larger than 8 microns, which are more likely to cause haze, might reduce alumina loading by about 30 or 40 percent.

Figure 5:
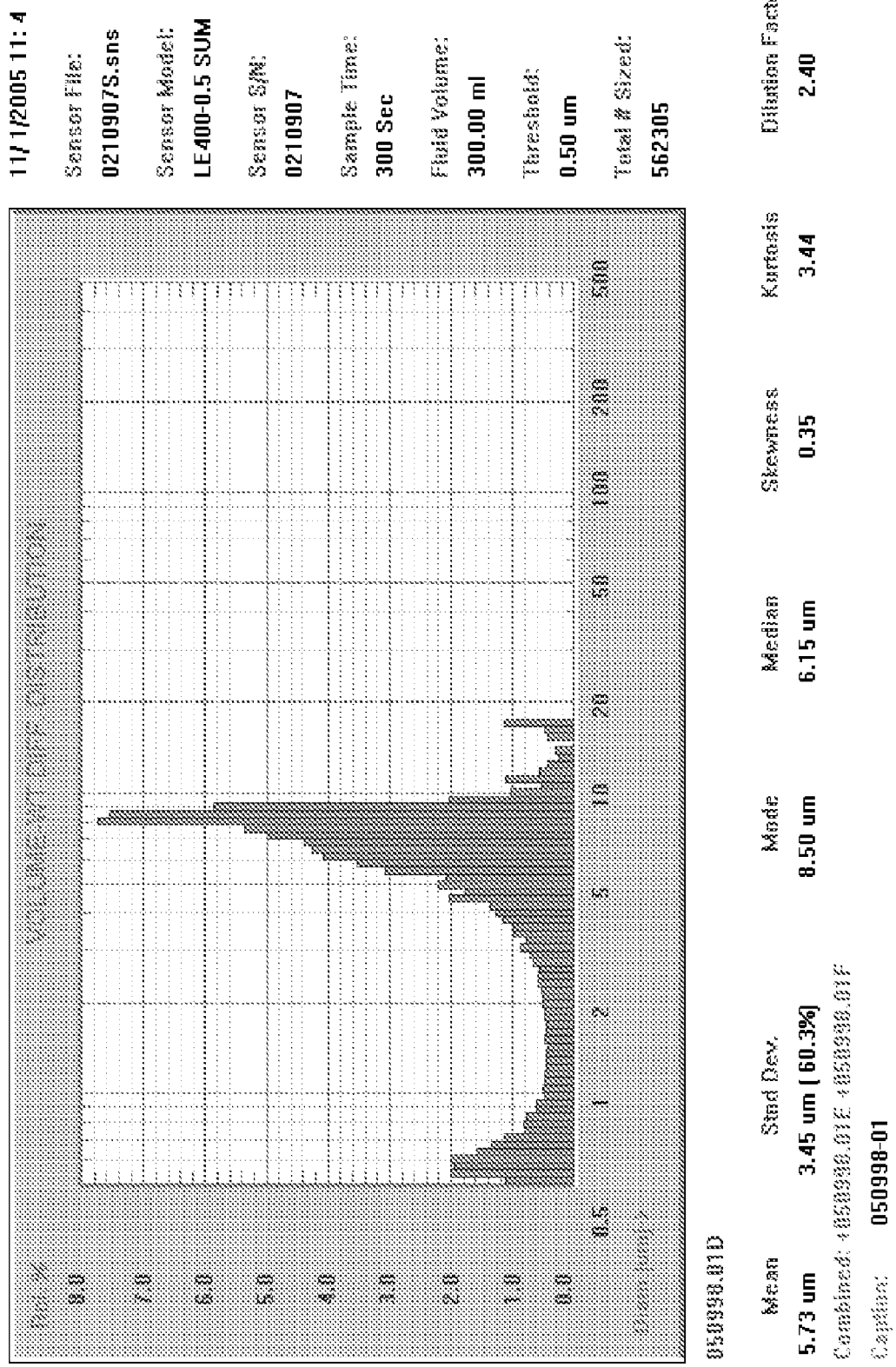
FIG. 5 is a volume-weighted differential distribution for an exemplary sample of surface-compatibilized alumina particles.

FIG. 5 is the volume-weighted differential distribution for the exemplary sample of surface-compatibilized alumina particles depicted in FIGS. 3 and 4. Table 2 (below) lists the particle size data for this exemplary sample of surface-compatibilized alumina particles as measured using an AccuSizer 780 Optical Particle Sizer:

TABLE 2

| Percent Total Particle Volume | Volume-Weighted Mean Diameter (μ) |
|---|---|
| 5 | <0.57 |
| 10 | <0.67 |
| 15 | <0.98 |
| 20 | <1.78 |
| 25 | <2.89 |
| 30 | <3.78 |
| 35 | <4.51 |
| 40 | <5.23 |
| 45 | <5.83 |
| 50 | <6.15 |
| 55 | <6.49 |
| 60 | <6.85 |
| 65 | <7.23 |
| 70 | <7.63 |
| 75 | <8.05 |
| 80 | <8.40 |
| 85 | <8.50 |
| 90 | <8.97 |
| 95 | <10.31 |
| 99 | <17.14 |

Figure 6:
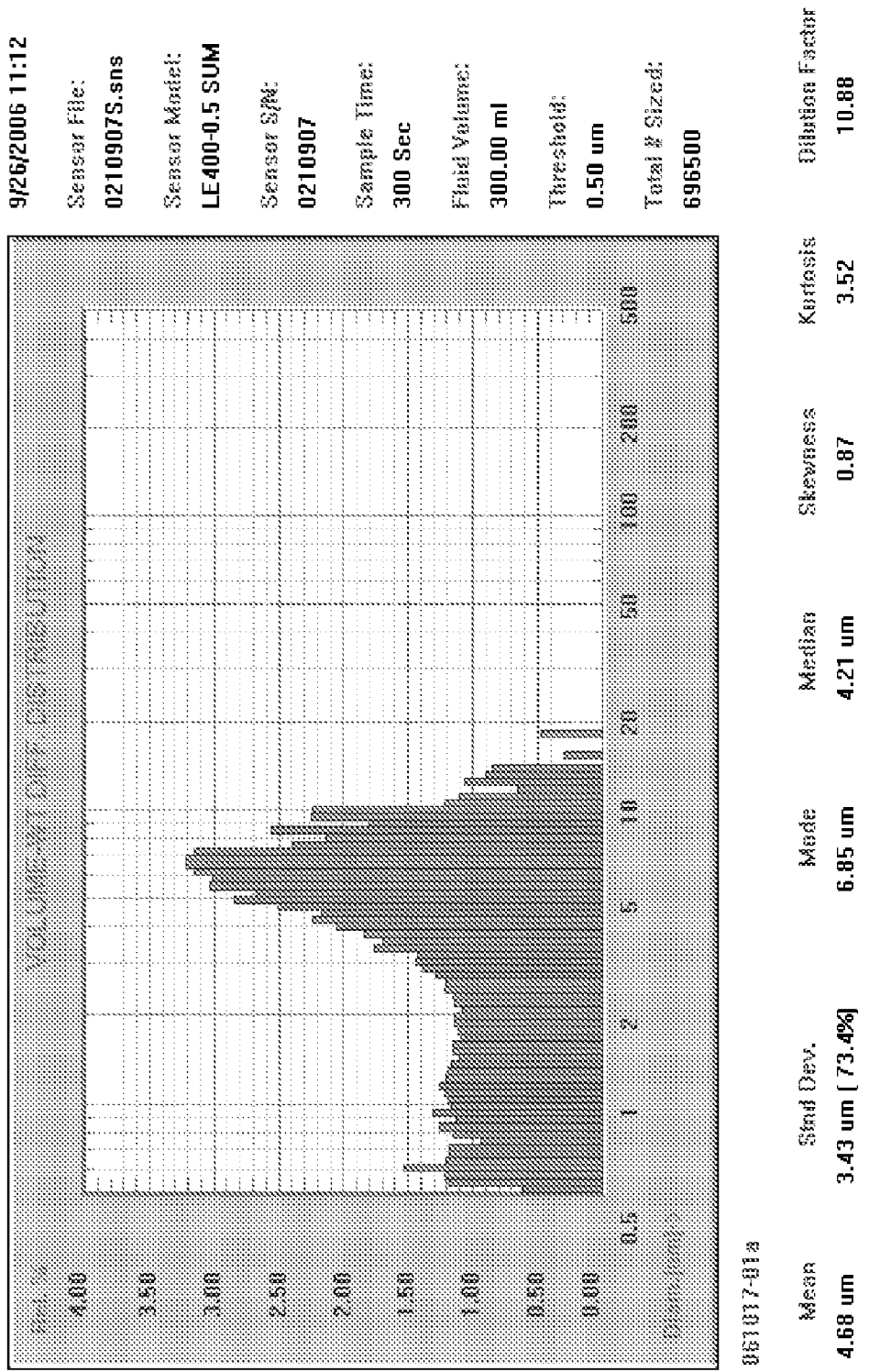
FIG. 6 is a volume-weighted differential distribution for another exemplary sample of surface-compatibilized alumina particles.

FIG. 6 is a volume-weighted differential distribution for another exemplary sample of surface-compatibilized alumina particles. Table 3 (below) lists the particle size data for this exemplary sample of surface-compatibilized alumina particles as measured using an AccuSizer 780 Optical Particle Sizer:

TABLE 3

| Percent Total Particle Volume | Volume-Weighted Mean Diameter (μ) |
|---|---|
| 5 | <0.64 |
| 10 | <0.79 |
| 15 | <0.98 |
| 20 | <1.23 |
| 25 | <1.60 |
| 30 | <1.98 |
| 35 | <2.53 |
| 40 | <3.05 |
| 45 | <3.59 |
| 50 | <4.21 |
| 55 | <4.69 |
| 60 | <5.23 |
| 65 | <5.77 |
| 70 | <6.15 |
| 75 | <6.85 |
| 80 | <7.23 |
| 85 | <8.35 |
| 90 | <9.47 |
| 95 | <11.13 |
| 99 | <13.82 |

As noted, average volume-weighted particle size distributions are determined before introducing the alumina into the polyethylene terephthalate polymers. For bulk powders (e.g., free alumina before introduction to the polymer matrix), particle size distribution may be achieved via single-particle optical sensing (SPOS), also called optical particle counting (OPC), using an AccuSizer 780 Optical Particle Sizer. Such particle size distributions can provide average number-weighted particle size, average area-weighted particle size, and average volume-weighted particle size. The *AccuSizer Model 780 User Manual* provides a useful discussion of single-particle optical sensing at pages 3-9. Pages 3-10, 34-38, and 49-56 of the *AccuSizer Model 780 User Manual*, which are provided as Attachment 2 to U.S. Provisional Patent Application Ser. No. 60/736,706, are incorporated herein in their entirety.

As used herein, the term "average volume-weighted particle size" refers to the volume-weighted differential distribution's mean rather than its median or mode. Those having ordinary skill in the art will appreciate that, as the density of alumina is presumed constant, a distribution by volume-weighted particle size is likewise a distribution by particle mass.

As the AccuSizer 780 Optical Particle Sizer has a measurement threshold of 0.5 micron (i.e., it cannot measure particles smaller than about 0.5 micron), the data for the number-weighted average differential distribution may be skewed upward. (Undetected particles are necessarily excluded from calculations of particle size distribution.) By volume weighting the measured particle size, however, distortion caused by these very small particles is appropriately minimized. The volume-weighted function employed is simply the mathematical formula for spherical volume based on particle diameter (i.e., volume=$4/3 \cdot \pi \cdot r^3$). See *AccuSizer Model 780 User Manual*, at pages 51-52.

As will be understood by those familiar with bulk powder measurements, particle size may be measured via other light scattering techniques, too. For example, particle sizes and distributions are often characterized according to ASTM B330-2 ("Standard Test Method for Fisher Number of Metal Powders and Related Compounds"). Alternatively, bulk particle sizes and distributions may be characterized using a Hegman Fineness number determined from ASTM D 1210-79.

Figure 7:
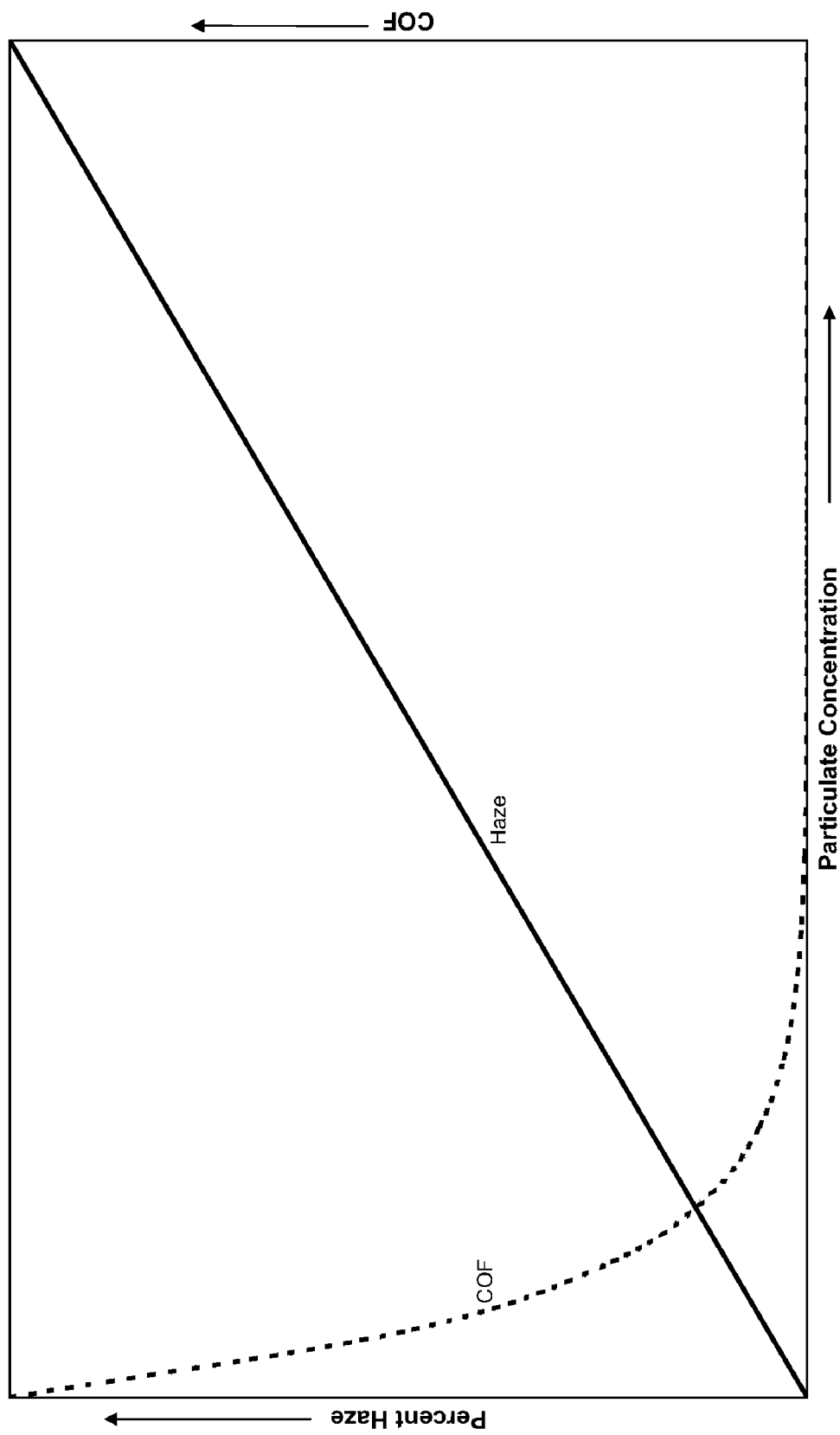
FIG. 7 illustrates the qualitative effect on bottle sidewall haze and friction as a function of increasing concentration of an inorganic additive.

Those having ordinary skill in the art will recognize that the inclusion of alumina (or other inorganic particulate additive) in polyester resin helps to reduce bottle friction, but at the cost of increased bottle haze. In other words, all things being equal, increasing alumina fractions reduces bottle COF but increases bottle haze. FIG. 7 depicts the inherent trade-off between reduced bottle COF and increased bottle haze.

Without being bound to any theory, empirical data suggest that, as a function of increasing alumina concentration within polyester resin, bottle haze increases linearly and bottle COF decreases non-linearly (e.g., akin to exponential decay). This means that even small fractions of alumina can provide substantial improvement to a resin's frictional properties (i.e., bottle COF) at a relatively small cost to the resin's clarity characteristics (i.e., bottle sidewall haze).

For instance, in a typical embodiment of the present invention, the addition of 200 ppm of surface-compatibilized alumina having an average volume-weighted particle size of between about 4 and 5 microns reduced coefficient of friction in two-liter carbonated soft drink bottles by more than 95 percent (as measured using ASTM Test method D 1894) and yet sidewall haze was kept below 3 percent. Moreover, the addition of 250 ppm of the same surface-compatibilized alumina further reduced coefficient of friction in two-liter carbonated soft drink bottles, and yet sidewall haze was maintained below 5 percent. Thus, for carbonated soft drink bottles or water bottles, each of which requires excellent clarity, it might be appropriate to enhance a polyester resin with between about 175 and 200 ppm of surface-compatibilized alumina having an average volume-weighted particle size of between about 3 and 6 microns. If bottle haze is less of a concern, of course, then additional alumina might be introduced to further improve the polyester resin's COF properties.

Those having ordinary skill in the art will know that there are two primary methods for making polyethylene terephthalate. Each of these methods reacts a terephthalate component and a diol component (i.e., a terephthalate moiety and a diol moiety) to form polyethylene terephthalate prepolymers, and then polymerizes the prepolymers via melt phase polycondensation to form polyethylene terephthalate polymers.

The first method involves a two-step ester exchange reaction and polymerization using dimethyl terephthalate and excess ethylene glycol. In this method, the aforementioned step of reacting a terephthalate component and a diol component includes reacting dimethyl terephthalate and ethylene glycol in a heated, catalyzed ester exchange reaction (i.e., transesterification) to form bis(2-hydroxyethyl)terephthalate monomers, as well as methanol as a byproduct. To enable the ester exchange reaction to go essentially to completion, methanol is continuously removed as it is formed. The bis(2-hydroxyethyl)terephthalate monomer product is then catalytically polymerized via polycondensation (i.e., melt phase and/or solid state polymerization) to produce polyethylene terephthalate polymers.

The second method employs a direct esterification reaction using terephthalic acid and excess ethylene glycol. In this method, the aforementioned step of reacting a terephthalate component and a diol component includes reacting terephthalic acid and ethylene glycol in a heated esterification reaction to form monomers and oligomers of terephthalic acid and ethylene glycol, as well as water as a byproduct. To enable the esterification reaction to go essentially to completion, water is continuously removed as it is formed. The monomers and oligomers are subsequently catalytically polymerized via polycondensation (i.e., melt phase and/or solid state polymerization) to form polyethylene terephthalate polyester. Ethylene glycol is continuously removed during polycondensation to create favorable reaction kinetics.

The polyethylene terephthalate polymers achieved via direct esterification of terephthalic acid are substantially identical to the polyethylene terephthalate polymers achieved via ester interchange of dimethyl terephthalate, albeit with some minor chemical differences (e.g., end group differences). As compared with the transesterification of dimethyl terephthalate, the direct esterification of terephthalic acid is not only more economical but often yields polyethylene terephthalate resins having better color.

Polyethylene terephthalate polyester may be produced in a batch process in which the product of the ester interchange or esterification reaction is formed in one vessel and then transferred to a second, agitated vessel for polymerization (i.e., melt phase polycondensation). Generally, the polycondensation reaction continues in the second vessel until the power used by the agitator indicates that the polyester melt has achieved the desired intrinsic viscosity and, thus, the desired molecular weight. It is more commercially practicable, however, to carry out the esterification or ester interchange reactions, and then the polymerization reaction as a continuous process. The continuous production of polyethylene terephthalate results in greater throughput, and so is more typical in large-scale manufacturing facilities.

Whether forming polyethylene terephthalate polymers via esterification or transesterification, one or more catalysts are typically employed to promote polymerization. Catalysts are usually introduced before melt phase polycondensation (i.e., during or immediately after esterification or transesterification) or shortly after the onset of melt phase polycondensation. Those having ordinary skill in the art will appreciate that the start of melt polycondensation is characterized by reduced pressure conditions (i.e., reaction at less than atmospheric pressure).

Exemplary catalysts include aluminum catalysts, antimony catalysts, germanium catalysts, and titanium catalysts. Other exemplary catalysts include cobalt catalysts, manganese catalysts, and zinc catalysts.

Those having ordinary skill in the art appreciate that catalyst loading depends upon catalytic efficacy. For example, titanium catalyst or germanium catalyst might be introduced in amounts sufficient for the resulting polyethylene terephthalate resin to include between about 2 and 50 ppm of elemental titanium or elemental germanium, respectively, whereas antimony might be introduced in amounts sufficient for the resulting polyethylene terephthalate resin to include between about 25 and 300 ppm of elemental antimony.

The inclusion of one or more catalysts increases production of the polyethylene terephthalate resins, but may lead to polymer degradation, such as discoloration (e.g., yellowing), acetaldehyde formation, or molecular weight reduction. To reduce these undesirable effects, stabilizing compounds—typically phosphorus in the form of phosphates and phosphites—can be employed to sequester ("cool") the catalysts. A phosphorus stabilizer may be introduced at any time but is typically added after esterification or transesterification (e.g. during and/or after melt phase polycondensation is essentially complete), in an amount sufficient for the resulting polyethylene terephthalate resin to include less than about 150 ppm elemental phosphorus, typically less than about 100 ppm (e.g., between about 20 and 50 ppm).

Those having ordinary skill in the art will appreciate that if added to deactivate one or more polymerization catalysts, phosphorus must be introduced in sufficient amounts to achieve that objective. Phosphorus in excess of the amount required to deactivate polymerization catalysts (e.g. more than about 100 ppm or 150 ppm) might be unnecessary but is not especially detrimental to the resulting polyethylene terephthalate resin.

Stabilizers may be introduced according to commonly assigned U.S. Pat. No. 5,898,058 for a Method of Post-Polymerization Stabilization of High Activity Catalysts in Continuous Polyethylene Terephthalate Production. Alternatively, stabilizers may be introduced according to the above-referenced, commonly assigned U.S. Pat. Nos. 6,599,596; 6,569,991; 6,573,359; 6,590,069; and 6,803,082.

In accordance with the present invention, alumina may be introduced to the polyethylene terephthalate precursors and polymers directly (e.g., as a powder), as a concentrate in polyethylene terephthalate (i.e., a masterbatch), or as a concentrate in an inert or reactive carrier.

The alumina may be introduced into the polyethylene terephthalate precursors prior to melt phase polycondensation. Alternatively, the alumina may also be introduced into the polyethylene terephthalate polymers during melt phase polycondensation, typically after the polymer melt achieves an intrinsic viscosity of at least about 0.45 dL/g (e.g. an intrinsic viscosity of between about 0.45 and 0.60 dL/g). In some instances, the alumina is introduced during melt phase polycondensation after the polymer melt achieves an intrinsic viscosity of at least about 0.60 dL/g. Finally, the alumina may also be introduced into the polyethylene terephthalate polymers after melt phase polycondensation.

A convenient point of addition in the polyethylene terephthalate polymerization process is post-completion of melt phase polycondensation (i.e., mixed with the molten polymer stream after the final polymerization vessel). Late addition (e.g., near or after the completion melt phase polycondensation) is desirable because high polycondensation temperatures can strip coupling agents from surface-compatibilized alumina. Late addition can be achieved, for example, using an extruder and/or a carrier.

In this regard, an extruder may be employed to facilitate addition of the alumina to polyethylene terephthalate polymers, particularly where the alumina is introduced as a dry, bulk powder. For example, pelletized polyethylene terephthalate polymers and alumina are introduced at—typically into—an extruder. As used herein, the concept of combining (or introducing, adding, etc.) the polyethylene terephthalate polymers and the alumina at an extruder embraces (1) introducing both the polyethylene terephthalate polymers and the alumina into the extruder; (2) introducing the alumina into the polyethylene terephthalate polymers before the extruder, and then mixing the polyethylene terephthalate polymers and the alumina within the extruder; and (3) introducing the alumina into the polyethylene terephthalate polymers (i.e., the polymer melt) after the extruder. Although introducing alumina at an extruder may hinder productivity at larger-scale operations, the use of an extruder enables quick formulation changes and may be convenient, especially for smaller-scale operations.

It has been observed that the alumina particles will form into agglomerates in the polymer melt. Accordingly, control over the degree of alumina agglomeration may be had by manipulating the timing and technique of alumina introduction. (In some instances, a dispersing agent may be included to facilitate dispersion of the alumina within the polymer melt.)

For example, it has been observed that relatively less alumina agglomeration occurs during masterbatching processes, such as where the alumina is introduced into the polyethylene terephthalate polymers via a polymeric masterbatch concentrate. An acceptable polymeric masterbatch concentrate may include an alumina loading of between about 1 and 2 weight percent. Those having ordinary skill in the art will recognize that such a polymeric masterbatch concentrate can be introduced into an unmodified polyethylene terephthalate, for instance, at about a 10:1 to 50:1 resin ratio.

An exemplary masterbatch technique is the split-stream method disclosed by U.S. Pat. No. 5,376,702 for a Process and Apparatus for the Direct and Continuous Modification of Polymer Melts, which is incorporated by reference in its entirety This patent discloses dividing a polymer melt stream into an unmodified stream and a branch stream that receives additives. In particular, a side stream takes a portion of the branch stream to an extruder, where additives are introduced. Such processes can be complicated and perhaps less practical where, as here, total alumina concentrations are low (e.g. less than about 3,000 ppm).

Introducing alumina to polyethylene terephthalate polymers via an extruder or masterbatch is effective, albeit impractical for continuous, large-scale operations. Using a carrier, especially a liquid carrier, can facilitate the introduction of alumina into polyethylene terephthalate polymers toward the completion of or after the completion of melt phase polycondensation. As noted, this kind of late addition can reduce the unwanted stripping of coupling agents from the surface-compatibilized alumina.

Typically, the alumina is introduced to the polyethylene terephthalate polymers via a reactive carrier, rather than via an inert carrier or no carrier at all. The reactive carrier, which has an exemplary molecular weight of less than about 10,000 g/mol (e.g. between about 200 g/mol and 10,000 g/mol) may be introduced during polycondensation, or more typically, after the polycondensation is complete. In either respect, the reactive carrier should be introduced to the polyethylene terephthalate polymers in quantities such that bulk polymer properties are not detrimentally affected.

The reactive carrier should not only function as a delivery vehicle for one or more additives, but also should be capable of reacting with the polyethylene terephthalate to bind the carrier in the polyethylene terephthalate resin. By combining with the polyethylene terephthalate polymer, the reactive carrier becomes non-extractable during subsequent processing operations (e.g., forming polyester preforms or beverage containers).

The reactive carrier typically has a melting point that ensures that it is a liquid or slurry at about 100° C., a temperature that can be achieved using low-pressure steam. An exemplary non-polymeric reactive carrier would have a melting point that ensures that it is a liquid or slurry at near ambient temperatures. Near ambient temperatures not only simplify the unit operations (e.g., extruders, heaters, and piping), but also minimize degradation of the particulate additives. As used herein, the term "near ambient" includes temperatures between about 20° C. and 60° C.

As a general matter, the reactive carrier should make up no more than about 1 weight percent of the polyethylene terephthalate resin (i.e., 10,000 ppm). The reactive carrier is typically introduced to the polyethylene terephthalate polymers in quantities such that its concentration in the polymer resin is less than about 1,000 ppm (i.e., 0.1 weight percent). Reducing the reactive carrier to quantities such that its concentration in the polymer resin is less than 500 ppm (i.e., 0.05 weight percent) will further reduce potential adverse effects to bulk polymer properties.

In general, reactive carriers having carboxyl, hydroxyl, or amine functional groups are favored. Suitable reactive carriers include esters (including low polymers derived from caprolactone), amides (including low polymers derived from caprolactam), imides, amines, isocyanates, oxazolines, acids, and anhydrides that are capable of reacting with the condensation polymers during solid state polymerization and not causing the polyethylene terephthalate polymers to suffer loss of molecular weight during subsequent heated processes, such as injection molding and extrusion operations.

Preferred are polyols, especially polyester polyols and polyether polyols, having a molecular weight that is sufficiently high such that the polyol will not substantially reduce the intrinsic viscosity of the polyethylene terephthalate polymer, and a viscosity that facilitates pumping of the polyol. Polyethylene glycol is a preferred polyol. Other exemplary polyols include functional polyethers, such as polypropylene glycol that is prepared from propylene oxide, random and block copolymers of ethylene oxide and propylene oxide, and polytetramethylene glycol that is derived from the polymerization of tetrahydrofuran.

An exemplary reactive carrier is a polyol (e.g., polyethylene glycol) having a molecular weight that permits the polyol to be pumped at near ambient temperatures (e.g., less than about 60° C.) and that is introduced to the polyethylene terephthalate polymers in quantities such that bulk properties of the polyethylene terephthalate polymers are not detrimentally affected (e.g. quantities such that its concentration in the polymers is less than about 1 weight percent).

Alternatively, the reactive carrier may also include dimer or trimer acids and anhydrides. In another embodiment, the reactive carrier may possess, in addition to or in place of terminal functional groups, internal functional groups (e.g., esters, amides, and anhydrides) that react with the polyethylene terephthalate polymers. In yet another embodiment, the reactive carrier may include esters without terminal functional groups, amides without terminal functional groups, or anhydrides without terminal functional groups that are capable of reacting into the polyethylene terephthalate polymers and that will not cause the polyethylene terephthalate polymers to suffer loss of molecular weight during injection molding or extrusion processes. As noted and as will be appreciated by those having ordinary skill in the art, reactive carriers derived from suitable heterocycles (e.g., caprolactone and caprolactam) are within the scope of the present invention.

As will be understood by those of ordinary skill in the art, macromolecules are considered to be polymers at an intrinsic viscosity of about 0.45 dL/g. For polyethylene terephthalate, this roughly translates to a molecular weight of at least about 13,000 g/mol. At this molecular weight, polyethylene terephthalate polymers possess sufficient molecular weight, mechanical properties, melt strength, and crystallinity to facilitate polymer processing.

In contrast, the reactive carriers according to the present invention have molecular weights that are more than about 200 g/mol and less than about 10,000 g/mol. The molecular weight of the reactive carrier is generally less than 6,000 g/mol, typically less than 4,000 g/mol, more typically between about 300 and 2,000 g/mol, and most typically between about 400 and 1,000 g/mol. As used herein, molecular weight refers to number-average molecular weight, rather than weight-average molecular weight.

Figure 8:
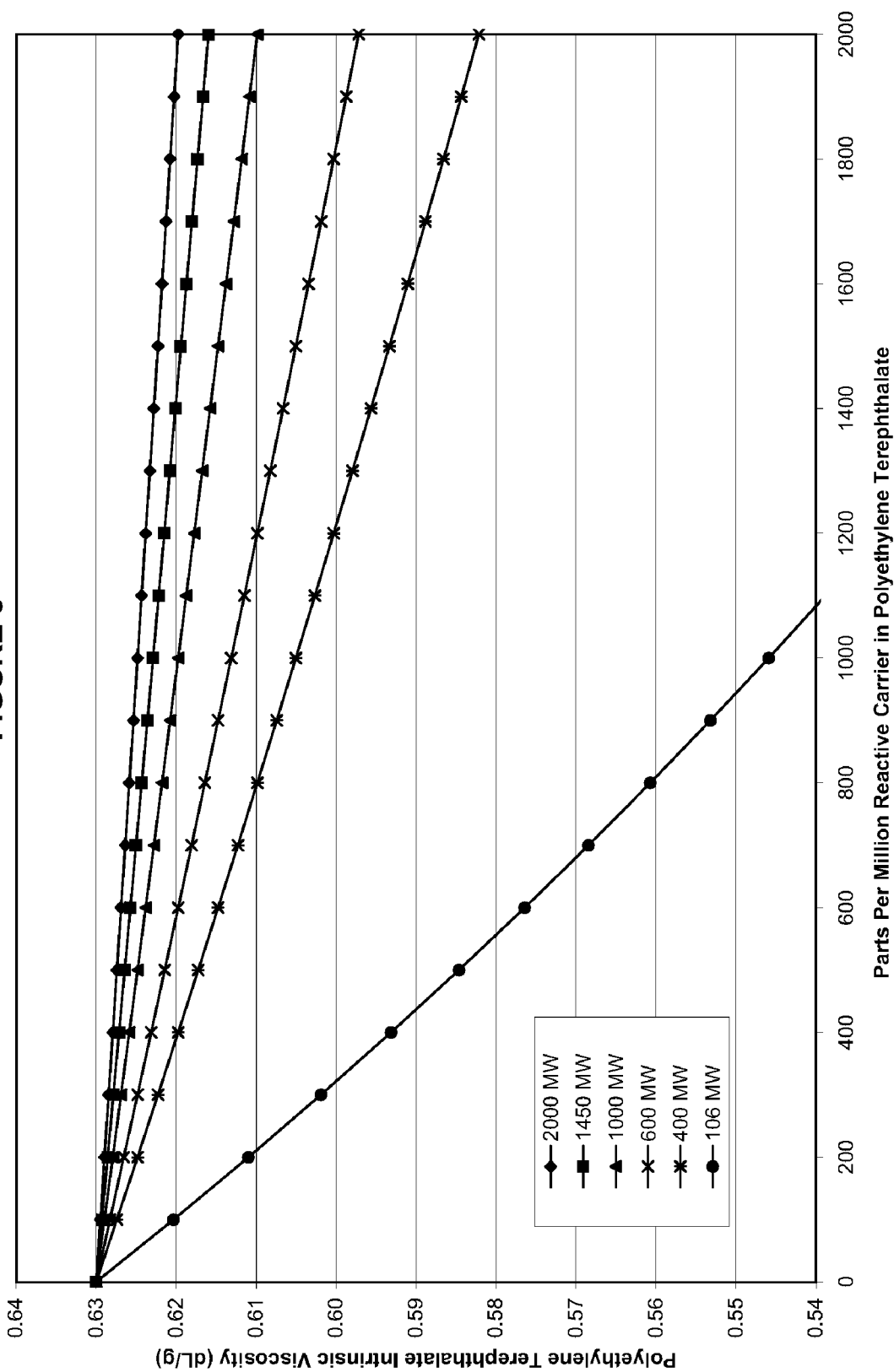
FIG. 8 illustrates the theoretical loss of intrinsic viscosity of polyethylene terephthalate having an intrinsic viscosity of 0.63 dL/g as a function of the concentration of the reactive carrier at various molecular weights.
Figure 9:
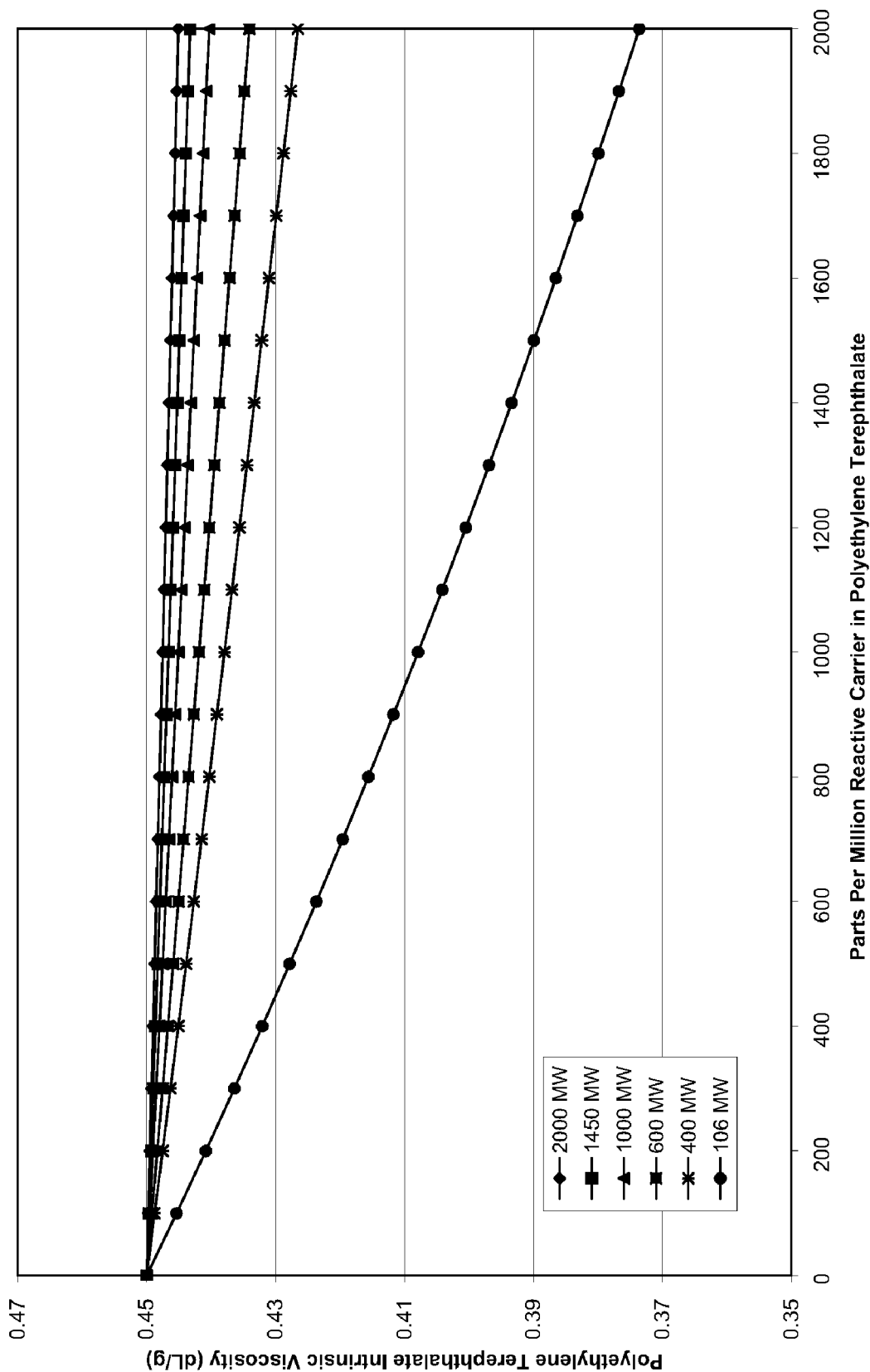
FIG. 9 illustrates the theoretical loss of intrinsic viscosity of polyethylene terephthalate having an intrinsic viscosity of 0.45 dL/g as a function of the concentration of the reactive carrier at various molecular weights.

FIGS. 8 and 9 illustrate the theoretical loss of intrinsic viscosity as a function of reactive carrier concentration at several molecular weights. FIG. 8 depicts the impact of the reactive carrier on polyethylene terephthalate having an intrinsic viscosity of 0.63 dL/g. Similarly, FIG. 9 depicts the impact of the reactive carrier on polyethylene terephthalate having intrinsic viscosity of 0.45 dL/g. Note that at any concentration, the reactive carriers having higher molecular weights have less adverse effect upon intrinsic viscosity of the polymer resin.

Use of reactive carriers is disclosed in the following aforementioned commonly assigned patents, each of which is incorporated entirely by reference: Ser. No. 09/738,150, for Methods of Post-Polymerization Injection in Continuous Polyethylene Terephthalate Production, filed Dec. 15, 2000, now U.S. Pat. No. 6,599,596; Ser. No. 09/932,150, for Methods of Post-Polymerization Extruder Injection in Polyethylene Terephthalate Production, filed Aug. 17, 2001, now U.S. Pat. No. 6,569,991; Ser. No. 10/017,612, for Methods of Post-Polymerization Injection in Condensation Polymer Production, filed Dec. 14, 2001, now U.S. Pat. No. 6,573,359; Ser. No. 10/017,400, for Methods of Post-Polymerization Extruder Injection in Condensation Polymer Production, filed Dec. 14, 2001, now U.S. Pat. No. 6,590,069; Ser. No. 10/628,077, for Methods for the Late Introduction of Additives into Polyethylene Terephthalate, filed Jul. 25, 2003, now U.S. Pat. No. 6,803,082; and Ser. No. 10/962,167, for Methods for Introducing Additives into Polyethylene Terephthalate, filed Oct. 8, 2004.

In view of the foregoing, an exemplary method of making the alumina-enhanced polyethylene terephthalate resin of the present invention includes reacting, in a heated esterification reaction, a diacid moiety that includes at least 90 mole percent terephthalic acid and a diol moiety that includes at least 90 mole percent ethylene glycol. The diacid and diol modifiers may be included such that the resulting polyethylene terephthalate polymer has less than about 12 mole percent substitution (e.g., between about 2 and 6 mole percent comonomer substitution). For example, the diacid moiety might include between about 3 and 6 mole percent isophthalic acid with the remainder terephthalic acid, and the diol moiety might include between about 1 and 4 mole percent diethylene glycol. Alternatively, the diacid moiety might include between about 1 and 3 mole percent isophthalic acid with the remainder terephthalic acid, and the diol moiety of includes between about 1 and 2 mole percent diethylene glycol, between about 1 and 3 mole percent cyclohexane dimethanol, and the remainder ethylene glycol. Those having ordinary skill in the art will recognize that it is within the scope the present invention to substitute a diester moiety (i.e., mostly dimethyl terephthalate) for the diacid moiety (i.e., mostly terephthalic acid).

The esterification reaction yields monomers and oligomers of terephthalic acid and diacid modifiers, and ethylene glycol and diol modifiers, as well as water, which is continuously removed as it is formed to enable the esterification reaction to go essentially to completion. The monomers and oligomers are then polymerized via melt phase polycondensation to form polyethylene terephthalate polymers having an intrinsic viscosity greater than about 0.50 dL/g (e.g., greater than about 0.55 dL/g), more typically greater than about 0.60 dL/g (e.g., greater than about 0.65 dL/g), and perhaps greater than about 0.70 dL/g (e.g., between about 0.70 dL/g and 0.90 dL/g, or greater than about 0.75 dL/g, such as between about 0.78 and 0.86 dL/g).

Thereafter, surface-compatibilized alumina having an average volume-weighted particle size of between about 3 and 6 microns is introduced in an amount sufficient to improve the COF properties of the polyethylene terephthalate polymers. For carbonated soft drink bottle resins, organosilane-treated alumina might be added at a loading of about 150-250 ppm and for custom, low-stretch articles, organosilane-treated alumina might be added at a loading of about 350-450 ppm. (A carbonated soft drink bottle might be formed at a stretch ratio of 12-14; a peanut butter jar might be formed at a stretch ratio of 3-4.) Uniform blending of the alumina within the polymer melt is achieved using a reactive carrier, such as polyethylene glycol having a molecular weight of between about 200 and 600 g/mol (e.g., about 400 g/mol), to function as the delivery vehicle for the surface-compatibilized alumina. Dispersing agents may be employed, too.

Thereafter, the polyethylene terephthalate polymers are formed into pellets, which are then crystallized and, optionally, polymerized in the solid state to an intrinsic viscosity of greater than about 0.70 dL/g (e.g., greater than about 0.75 dL/g) and more typically greater than about 0.80 dL/g (e.g., between about 0.81 and 0.87 dL/g). In some instances, the polyethylene terephthalate polymers are polymerized in the solid state to an intrinsic viscosity of greater than about 0.85 dL/g (e.g., 0.9-1.1 dL/g). In many instances, the polyethylene terephthalate polymers are polymerized in the solid state to an intrinsic viscosity of less than 0.86 dL/g (e.g. 0.75-0.78 dL/g).

As noted, the two main processes for making polyethylene terephthalate (i.e., ester interchange and direct esterification) each (i) react a terephthalate component and a diol component (i.e., a terephthalate moiety and a diol moiety) to form polyethylene terephthalate prepolymers and (ii) then polymerize the prepolymers (i.e., melt phase polycondensation and/or solid state polymerization) to form polyethylene terephthalate polymers.

Those having ordinary skill in the art will appreciate that most commercial polyethylene terephthalate polymers are, in fact, modified polyethylene terephthalate polyesters (i.e., the reaction of the terephthalate moiety and the diol moiety typically yields polyethylene terephthalate prepolymers having at least some comonomer substitution.) Indeed, the "polyethylene terephthalate" resins described herein are typically modified polyethylene terephthalate polyesters. In this regard, the modifiers in the terephthalate component and the diol component (i.e., the terephthalate moiety and the diol moiety) are typically randomly substituted in the resulting polyester composition.

The polyethylene terephthalate generally includes less than about 12 mole percent comonomer substitution (e.g., between about 1 and 10 mole percent modifiers). The polyethylene terephthalate more typically includes less than 8 mole percent comonomer substitution and more than 2 mole percent comonomer substitution (e.g., between about 3 and 6 mole percent modifiers).

As used herein, the term "diol component" refers primarily to ethylene glycol, although other diols (e.g., diethylene glycol) may be used as well.

The term "terephthalate component" broadly refers to diacids and diesters that can be used to prepare polyesters, particularly polyethylene terephthalate. In particular, the terephthalate component mostly includes either terephthalic acid or dimethyl terephthalate, but can include diacid and diester comonomers as well. In other words, the "terephthalate component" is either a "diacid component" or a "diester component."

The term "diacid component" refers somewhat more specifically to diacids (e.g., terephthalic acid) that can be used to prepare polyethylene terephthalate via direct esterification. The term "diacid component," however, is intended to embrace relatively minor amounts of diester comonomer (e.g., mostly terephthalic acid and one or more diacid modifiers, but optionally with some diester modifiers, too).

Similarly, the term "diester component" refers somewhat more specifically to diesters (e.g., dimethyl terephthalate) that can be used to prepare polyethylene terephthalate via ester exchange. The term "diester component," however, is intended to embrace relatively minor amounts of diacid comonomer (e.g., mostly dimethyl terephthalate and one or more diester modifiers, but optionally with some diacid modifiers, too).

Moreover, as used herein, the term "comonomer" is intended to include monomeric and oligomeric modifiers (e.g., polyethylene glycol).

The diol component can include other diols besides ethylene glycol (e.g., diethylene glycol, polyalkylene glycols, 1,3-propane diol, 1,4-butane diol, 1,5-pentanediol, 1,6-hexanediol, propylene glycol, 1,4-cyclohexane dimethanol (CHDM), neopentyl glycol, 2-methyl-1,3-propanediol, 2,2,4,4-tetramethyl-1,3-cyclobutanediol, adamantane-1,3-diol, 3,9-bis(1,1-dimethyl-2-hydroxyethyl)-2,4,8,10-tetraoxaspiro[5.5]undecane, and isosorbide), or the terephthalate component, in addition to terephthalic acid or its dialkyl ester (i.e., dimethyl terephthalate), can include modifiers such as isophthalic acid or its dialkyl ester (i.e., dimethyl isophthalate), 2,6-naphthalene dicarboxylic acid or its dialkyl ester (i.e., dimethyl 2,6 naphthalene dicarboxylate), adipic acid or its dialkyl ester (i.e., dimethyl adipate), succinic acid, its dialkyl ester (i.e., dimethyl succinate), or its anhydride (i.e., succinic anhydride), or one or more functional derivatives of terephthalic acid. The terephthalate component may also include phthalic acid, phthalic anhydride, biphenyl dicarboxylic acid, cyclohexane dicarboxylic acid, anthracene dicarboxylic acid, adamantane 1,3-dicarboxylic acid, glutaric acid, sebacic acid, or azelaic acid.

For polyethylene terephthalate resins according to the present invention, isophthalic acid, diethylene glycol, and 1,4-cyclohexane dimethanol are the typical modifiers. In such formulations, the terephthalate component may include at least 90 mole percent terephthalic acid or its dialkyl ester, dimethyl terephthalate, and the diol component may include at least 90 mole percent ethylene glycol. More typically, the terephthalate component includes at least 94 mole percent terephthalic acid or its dialkyl ester and the diol component includes at least 94 mole percent ethylene glycol.

It will be understood that diacid comonomer should be employed when the terephthalate component is mostly terephthalic acid (i.e., a diacid component), and diester comonomer should be employed when the terephthalate component is mostly dimethyl terephthalate (i.e., a diester component).

It will be further understood by those having ordinary skill in the art that to achieve the polyester composition of the present invention a molar excess of the diol component is reacted with the terephthalate component (i.e., the diol component is present in excess of stoichiometric proportions). In reacting a diacid component and a diol component via a direct esterification reaction, the molar ratio of the diacid component and the diol component is typically between about 1.0:1.0 and 1.0:1.6. Alternatively, in reacting a diester component and a diol component via an ester interchange reaction, the molar ratio of the diester component and the diol component is typically greater than about 1.0:2.0.

The diol component usually forms the majority of terminal ends of the polymer chains and so is present in the resulting polyester composition in slightly greater fractions. This is what is meant by the phrases "about a 1:1 molar ratio of a terephthalate component and a diol component," "about a 1:1 molar ratio of a diacid component and a diol component," and "about a 1:1 molar ratio of the diester component and the diol component," each of which may be used to describe the polyester compositions of the present invention.

The polyethylene terephthalate resin is typically composed of about a 1:1 molar ratio of a diacid component and a diol component. The diacid component typically includes at least 90 mole percent terephthalic acid (e.g., terephthalic acid and isophthalic acid) and the diol component includes at least 90 mole percent ethylene glycol (e.g., ethylene glycol and diethylene glycol). More typically, the diacid component includes at least 95 mole percent terephthalic acid (e.g. terephthalic acid and isophthalic acid) and the diol component includes at least 95 mole percent ethylene glycol (e.g. ethylene glycol, diethylene glycol, and 1,4-cyclohexane dimethanol). Analogous ranges apply to polyethylene terephthalate resins composed of diester (i.e., mostly dimethyl terephthalate) and diol components.

In an exemplary embodiment, the polyethylene terephthalate includes about a 1:1 molar ratio of (i) a diacid component of mostly terephthalic acid and (ii) a diol component of between about 1 and 2 mole percent diethylene glycol, between about 1 and 3 mole percent 1,4-cyclohexane dimethanol, and the remainder ethylene glycol. In an alternative exemplary embodiment, the polyethylene terephthalate includes about a 1:1 molar ratio of (i) a diester component of mostly dimethyl terephthalate and (ii) a diol component of between about 1 and 2 mole percent diethylene glycol, between about 1 and 3 mole percent 1,4-cyclohexane dimethanol, and the remainder ethylene glycol.

The alumina-enhanced polyethylene terephthalate resin according to the present invention generally possesses an intrinsic viscosity of more than about 0.50 dL/g, typically more than about 0.60 dL/g, and more typically more than about 0.68 dL/g. Those having ordinary skill in the art will appreciate, however, that during injection molding operations polyester resins tend to lose intrinsic viscosity (e.g., an intrinsic viscosity loss of about 0.02-0.06 dL/g from chip to preform).

The polyethylene terephthalate resin has an exemplary intrinsic viscosity of more than about 0.70 dL/g or less than about 0.90 dL/g, or both (i.e., between about 0.68 dL/g and 0.80 dL/g). The polyethylene terephthalate may have an intrinsic viscosity of more than about 0.72 dL/g or less than about 0.78 dL/g (e.g., 0.74-0.76 dL/g), or both (i.e., between about 0.72 dL/g and 0.78 dL/g). Alternatively, the polyethylene terephthalate may have an intrinsic viscosity of more than about 0.78 dL/g (e.g., 0.81 dL/g) or less than about 0.86 dL/g (e.g., 0.84 dL/g), or both (i.e., between about 0.78 dL/g and 0.86 dL/g).

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., *Dictionary of Fiber and Textile Technology*, Hoechst Celanese Corporation (1990); Tortora & Merkel, *Fairchild's Dictionary of Textiles* (7$^{th}$ Edition 1996).

Intrinsic viscosity can be measured and determined without undue experimentation by those of ordinary skill in this art. For the intrinsic viscosity values described herein, the intrinsic viscosity is determined by dissolving the copolyester in an orthochlorophenol mixture, measuring the relative viscosity of the solution using a Schott Autoviscometer (AVS Schott and AVS 500 Viscosystem), and then calculating the intrinsic viscosity based on the relative viscosity. See, e.g., *Dictionary of Fiber and Textile Technology* ("intrinsic viscosity").

In particular, a 0.6-gram sample (+/−0.005 g) of dried polymer sample is dissolved in about 50 ml (61.0-63.5 grams) of an orthochlorophenol mixture at a temperature of about 105° C. Fibrous samples are typically cut into small pieces, whereas chip samples are ground. After cooling to room temperature, the solution is placed in the viscometer at a controlled, constant temperature, (e.g., between about 20° and 25° C.), and the relative viscosity is measured. As noted, intrinsic viscosity is calculated from relative viscosity.

As measured in a step parison, the polyethylene terephthalate of the present invention typically possesses less than about 20 percent haze—preferably less than about 15 percent haze—at a thickness of more than about 6 mm and less than about 5 percent haze at a thickness of more than about 4 mm. Moreover, as measured in a step parison, the polyethylene terephthalate preferably possesses less than about 10 percent haze at a thickness of more than about 4.5 mm, and sometimes at a thickness of more than 5.5 mm (e.g., less than about 10 percent haze at a thickness of between 4.5 and 6.0 mm). In some formulations, the polyethylene terephthalate possesses less than about 20 percent haze at a thickness of between 5.5 and 6.5 mm as measured in a step parison.

As measured in a polyester container having a sidewall thickness of less than about 0.02 inch (0.5 mm), the polyethylene terephthalate of the present invention typically possesses less than about 15 percent haze-preferably less than about 10 percent haze. Such a container might be designed for a product capacity of less than about 2.5 liters (e.g. a two-liter carbonated soft drink bottle).

As measured in a two-liter polyester bottle having a sidewall thickness of about 0.014 inch (0.35 mm), the polyethylene terephthalate of the present invention typically possesses less than about 15 percent sidewall haze, typically less than about 10 percent sidewall haze, and more typically less than about 5 percent sidewall haze (e.g. 3-4 percent or less sidewall haze). Those having ordinary skill in the art will understand as 16-ounce (~500-milliliter) and 20-ounce (~600-milliliter) carbonated soft drink bottles may have somewhat thinner sidewalls, sidewall haze will be comparable (or better) than the sidewall haze achieved for two-liter polyester bottles. More specifically, sidewalls for two-liter carbonated soft drink bottles are typically less than 0.014 inch (0.35 mm), whereas sidewalls for 16-ounce (~500-milliliter) and 20-ounce (~600-milliliter) carbonated soft drink bottles are typically about 0.010-0.012 inch (about 0.25-0.30 mm).

Those having ordinary skill in the art will appreciate that these nominal bottle volumes refer to product delivery amount rather than maximum capacity. As bottles are designed and formed with headspace allocations, a bottle's total capacity is somewhat larger than its nominal size. In other words, it is the amount of delivered product that determines nominal bottle size. For instance, a nominal two-liter bottle actually possesses a total capacity of more than two liters.

Those having ordinary skill in the art understand that polyethylene terephthalate sheets, films, preforms and bottles must possess excellent color (i.e., not too yellow or dark). In this regard, color differences are commonly classified according to the L*a*b* color space of the Commission Internationale l'Eclairage (CIE). The three components of this system consist of L*, which describes luminosity on a scale of 0-100 (i.e., 0 is black and 100 is white), a*, which describes the red-green axis (i.e., positive values are red and negative values are green), and b*, which describes the yellow-blue axis (i.e., positive values are yellow and negative values are blue). For characterizing polyester resins, L* and b* values are of particular interest.

In this regard, it is preferred that polyester color be measured after crystallization and polymerization in the solid phase. After solid state polymerization, the polyethylene terephthalate resin of the present invention possesses an L* value (i.e., luminosity) of more than about 70, typically more than about 75 (e.g., 77), and in some instances more than about 80 as classified in the CIE L*a*b* color space. That said, the polyethylene terephthalate resin can possess an L* value as low as about 65 and still be suitable for carbonated soft drink bottles. In addition, the polyethylene terephthalate resin typically possesses a b* color value of less than about 2 (e.g., less than about 0) as classified by the CIE L*a*b* color space. For instance, the polyethylene terephthalate resin might possess a b* color value of between about −3 and 2 as classified by the CIE L*a*b* color space.

Those having ordinary skill in the art will appreciate that although color can be measured in polyester preforms and polyester bottles, color is often more conveniently measured in polyester pellets or polyester plaques. (As set forth herein, the term "pellets" is used generally to refer to chips, pellets, and the like.)

Those having ordinary skill in the art will know that polyethylene terephthalate resins are typically formed into pellets before undergoing crystallization and/or solid state polymerization. As a result, after crystallization (and/or solid state polymerization) but prior to polymer processing (e.g., injection molding), the polyethylene terephthalate resins of the present invention are crystalline pellets; it is preferred that color be measured in that form. In this regard and unless otherwise indicated (e.g., such as with respect to non-crystalline plaques), the CIE L*a*b* color space values reported herein for the polyethylene terephthalate resins of the present invention relate to crystalline polyethylene terephthalate pellets.

CIE L*a*b* color space values for the crystalline polyethylene terephthalate pellets were determined using a Hunter-Lab LabScan XE spectrophotometer (illuminant/observer: D65/10°; 0°/45° geometry; perfect reflectance diffuser NBS78; standard color tile LX16696). Those having ordinary skill in the art will appreciate that crystalline polyester pellets are translucent and so are typically measured via reflectance using a clear sample cup. In this regard, test procedures (e.g., standards and calibrations) appropriate for measuring color properties of crystalline polyester in various forms (e.g., pellets) are readily available to and within the understanding of those having ordinary skill in the art.

As described herein, the polyethylene terephthalate resin of the present invention can be injection molded into preforms, which in turn may be blow molded into bottles. Measuring color in preforms and bottles, however, can be awkward. Consequently, it is preferred that preforms and bottles be formed into plaques to facilitate comparative color measurements. In this regard, the polyethylene terephthalate preforms and bottles according to the present invention are ground, melted at 280° C., and then injected into a cold mold to form standard, three-millimeter (3 mm) non-crystalline polyester test plaques. The CIE L*a*b* color space values reported herein for the polyethylene terephthalate preforms and bottles of the present invention relate to measurements taken upon such standard test plaques. (Those having ordinary skill in the art will understand that in addition to color measurements, haze measurements can be performed on these three-millimeter non-crystalline polyester test plaques.)

As these standard test plaques are formed from either polyester preforms or polyester bottles, the constituent polyesters may possess unfavorable heat histories. Those having ordinary skill in the art will appreciate that this may somewhat degrade the constituent polyesters. In this regard, it has been observed that injection molding preforms from the crystalline polyethylene terephthalate pellets of the present invention (and thereafter forming standard test plaques) can introduce some yellowing (i.e., the b* color value increases slightly).

Accordingly, the polyethylene terephthalate preforms and bottles of the present invention typically possess a b* color value of less than about 4—more preferably less than about 2 (e.g., less than about 0)—as classified by the CIE L*a*b* color space. Most preferably, the polyethylene terephthalate preforms and bottles possess a b* color value of between about −3 and 3 as classified by the CIE L*a*b* color space.

Like the aforementioned crystalline polyethylene terephthalate pellets, however, the polyethylene terephthalate preforms and bottles of the present invention possess an L* value of more than about 65 (e.g., 70 or more), typically more than about 75 (e.g., 77), and preferably more than about 80 (e.g., 83 or more) as classified in the CIE L*a*b* color space. As noted, these CIE L*a*b* color space values for preforms and bottles refer to measurements from standard, non-crystalline polyester test plaques.

CIE L*a*b* color space values for the three-millimeter, non-crystalline polyethylene terephthalate test plaques can be determined using a HunterLab UltraScan XE spectrophotometer (illuminant/observer: D65/10°; diffuse 8° geometry; transmittance port). Those having ordinary skill in the art will appreciate that non-crystalline polyester plaques are essentially transparent and so are measured by transmittance. In this regard, test procedures (e.g., standards and calibrations) appropriate for measuring color properties of non-crystalline polyester in various forms are readily available to and within the understanding of those having ordinary skill in the art.

In an exemplary process, a continuous feed of terephthalic acid and excess ethylene glycol enters a direct esterification vessel. The esterification vessel is operated at a temperature of between about 240° C. and 290° C. (e.g., 260° C.) and at a pressure of between about 5 and 85 psia (e.g., atmospheric pressure) for between about one and five hours. The esterification reaction forms low molecular weight monomers, oligomers, and water. The water is removed as the reaction proceeds to provide favorable reaction equilibrium.

Thereafter, the low molecular weight monomers and oligomers are polymerized via melt polycondensation to form polyethylene terephthalate polyester. This polycondensation stage generally employs a series of two or more vessels and is operated at a temperature of between about 250° C. and 305° C. for between about one and four hours. The polycondensation reaction usually begins in a first vessel called the low polymerizer. The low polymerizer is operated at a pressure range of between about 0 and 70 torr (e.g., 10-60 mm Hg). The monomers and oligomers polycondense to form polyethylene terephthalate prepolymers and polymers (i.e., the polymer melt), as well as ethylene glycol.

To promote favorable reaction kinetics, ethylene glycol is removed from the polymer melt using an applied vacuum to drive the reaction to completion. In this regard, the polymer melt is typically agitated to promote the escape of the ethylene glycol from the polymer melt and to assist the highly viscous polymer melt in moving through the polymerization vessel.

As the polymer melt is fed into successive vessels, the molecular weight and thus the intrinsic viscosity of the polymer melt increases. The temperature of each vessel is generally increased and the pressure decreased to allow greater polymerization in each successive vessel.

The final vessel, generally called the "high polymerizer," is operated at a pressure of between about 0 and 40 torr. Like the low polymerizer, each of the polymerization vessels is connected to a vacuum system having a condenser, and each is typically agitated to facilitate the removal of ethylene glycol and degradation byproducts. The residence time in the polymerization vessels and the feed rate of the ethylene glycol and terephthalic acid into the continuous process is determined, in part, based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polymerization vessels.

Surface-compatibilized alumina having an average volume-weighted particle size of less than about 6 microns may be injected into the high polymerizer or at its outlet using a liquid carrier, typically a reactive carrier. Alternatively, late addition can be achieved directly or via carrier using extruder-based or masterbatch unit operations. As discussed, the alumina particles will form alumina agglomerates, typically having an average volume-weighted Feret's diameter of less than 10 microns (e.g., between about 1 and 6 microns).

Note that in addition to the formation of polyethylene terephthalate polymers, side reactions occur that produce undesirable by-products. For example, the esterification of ethylene glycol forms diethylene glycol, which is incorporated into the polymer chain. As is known to those of skill in the art, diethylene glycol lowers the softening point of the polymer. Moreover, cyclic oligomers (e.g., trimer and tetramers of terephthalic acid and ethylene glycol) may occur in minor amounts. The continued removal of ethylene glycol as it forms in the polycondensation reaction will generally reduce the formation of these by-products. With respect to unwanted byproducts, acetaldehyde is kept below 5 ppm.

After the polymer melt exits the polycondensation stage, typically from the high polymerizer, it is generally filtered and extruded. After extrusion, the polyethylene terephthalate is quenched, typically by spraying with water, to solidify it. The solidified polyethylene terephthalate polyester is cut into chips or pellets for storage and handling purposes. The polyester pellets typically have an average mass of about 15-20 mg. As used herein, the term "pellets" is used generally to refer to chips, pellets, and the like.

As will be known to those of skill in the art, the pellets formed from the polyethylene terephthalate polymers may be subjected to crystallization and, if necessary, solid state polymerization to increase the molecular weight of the polyethylene terephthalate resin.

The polyethylene terephtalate resin may be converted into stretch-blow molded bottles by either a one-step process or, more typically, a two-step process. In a one-step process, an amorphous bottle preform is produced from bottle resin by melting the resin in an extruder and injection molding the molten polyester into a hot preform. The hot preform is immediately placed into a bottle mold and, by stretching and inflating with high-pressure air, formed into a bottle (i.e., stretch-blow molding). The two-step process forms the preforms and bottles in separate steps. First the amorphous bottle preform is formed. Later, the cool preform is reheated to an orientation temperature—typically 30° C. above the glass transition temperature—to facilitate bottle formation by stretch-blow molding.

A preform defect is typically transferred to the resulting bottle. Accordingly, the quality of the bottle resin used to form injection-molded preforms is critical to achieving commercially acceptable bottles. Aspects of injection-molding preforms and stretch-blow molding bottles are discussed in U.S. Pat. No. 6,309,718 for Large Polyester Containers and Method for Making the Same, which is hereby incorporated entirely herein by reference.

Although the prior discussion assumes a continuous production process, it will be understood that the invention is not so limited. The teachings disclosed herein may be applied to semi-continuous processes and even batch processes.

As discussed, the invention embraces polyester resin that is capable of being formed into low-haze, high-clarity articles possessing reduced coefficient of friction. And, of course, polyethylene terephthalate is an exemplary polyester.

The present application's emphasis upon polyester resins notwithstanding, it is believed that that articles formed from other alumina-modified condensation polymers (e.g., polyamides, polyimides, and polycarbonates) would likewise demonstrate COF reduction. Similarly, it is believed that non-polyester resins, such as high-density polyethylene (HDPE), low-density polyethylene (LDPE), linear low-density polyethylene (LLDPE), polyvinyl chloride (PVC), and polyvinyl dichloride (PVDC), which are typically used in films, would also benefit from the use of alumina to reduce coefficient of friction.

In yet another aspect, the invention is a system of matching a particular polymer matrix with an appropriate COF additive. In this way, the particular polymer matrix may be enhanced with larger amounts of the COF additive without adversely affecting the clarity of articles formed from the enhanced polymer.

Without being bound to a particular theory, it is believed that differences in refractive index between a COF additive and the polymer matrix may lead to haze problems. Accordingly, matching the respective refraction indices of the COF additive and the polymer matrix may improve clarity in articles formed from enhanced polymer resin. For example, homopolymer polyethylene terephthalate possesses an index of refraction of about 1.64 and boehmite, AlO(OH) (CAS1318-23-6), which has been observed to be compatible with polyethylene terephthalate, possesses an index of refraction of about 1.645. By way of comparison, talc possesses an index of refraction of between 1.54 and 1.55.

Likewise, it is thought that modifying a particular kind of polymer (e.g., polyethylene or polyamide) via comonomer substitution may change the index of refraction for that modified polymer. Therefore, without being bound to any theory, it is yet another aspect of the invention to provide a system of selection with respect to the COF additive depending on the kind and quantity of comonomer modifier present in the polymer matrix. In other words, the invention embraces the selection of a particular COF additive given a particular polymer matrix. In this regard, it is thought that the COF additive should possess an index of refraction that matches the polymer matrix within about 0.1 (e.g., within 0.075), typically 0.05 (e.g., within 0.025), and more typically 0.01.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A polyester bottle resin, comprising:
polyethylene terephthalate; and
surface-compatibilized alumina comprising alumina particles chemically bonded to para-toluene sulfonic acid in an amount of 0.5-3 wt % based on the weight of the alumina, wherein the surface-compatibilized alumina is present in the polyester bottle resin as agglomerates having an average volume-weighted Feret's diameter of between 4 and 10 microns wherein agglomerates having an average Feret's diameter of greater than 10 μm are eliminated; and
wherein the polyester bottle resin has a total alumina loading of between about 5 and 1,500 ppm.

2. A polyester bottle resin according to claim 1, wherein the polyester bottle resin has a total alumina loading of between about 50 and 500 ppm.

3. A polyester bottle resin according to claim 1, wherein the surface-compatibilized alumina is present in the polyester bottle resin as agglomerates having an average volume-weighted Feret's diameter of between about 5 and 10 microns.

4. A polyester bottle resin according to claim 1, wherein the surface-compatibilized alumina is present in the polyester bottle resin as agglomerates having an average Feret's diameter of between about 7 and 10 microns.

5. A polyester bottle resin according to claim 1, wherein the alumina possesses an index of refraction that matches that of the polyethylene terephthalate within 0.1.

6. A polyester bottle resin according to claim 1, wherein the alumina possesses an index of refraction that matches that of the polyethylene terephthalate within 0.01.

7. A polyester bottle resin according to claim 1, wherein the polyethylene terephthalate includes between about 2 and 8 mole percent comonomer substitution.

8. A polyester bottle resin according to claim 1, wherein the polyester bottle resin possesses less than 10 percent haze at a thickness of between 4.5 and 6.0 mm as measured in a step parison.

9. A polyester preform or a polyester container formed from the polyester bottle resin of claim 1.

10. A polyester container, comprising:
polyethylene terephthalate; and
surface-compatibilized alumina comprising alumina particles chemically bonded to para-toluene sulfonic acid in an amount of 0.5-3 wt % based on the weight of the alumina, wherein the surface-compatibilized alumina is present in the polyester container as agglomerates having an average volume-weighted Feret's diameter of between 4 and 10 microns wherein agglomerates having an average Feret's diameter of greater than 10 μm are eliminated; and wherein the polyester container has a total alumina loading of between about 5 and 1,500 ppm.

11. A polyester container according to claim 10, wherein the polyester container has a total alumina loading of between about 50 and 500 ppm.

12. A polyester container according to claim 10, wherein the surface-compatibilized alumina comprises alumina treated with an organosilane coupling agent, wherein the surface-compatibilized alumina comprises agglomerates having an average Feret's diameter of between about 5 and 10 microns.

13. A polyester container according to claim 10, wherein the polyester container is a polyester bottle having sidewall haze of less than 5 percent.

14. A polyester container according to claim 10, wherein:
the polyester container possesses a reduced coefficient of friction as compared with an otherwise identical container without alumina; and
the polyester container possesses reduced sidewall haze as compared with an otherwise identical container that includes alumina without surface modification.

* * * * *